United States Patent
Chen et al.

(10) Patent No.: US 11,790,343 B2
(45) Date of Patent: *Oct. 17, 2023

(54) SYSTEM AND METHOD FOR INTEGRATING DATA FROM A REMOTE SERVER WITH A CLIENT APPLICATION

(71) Applicant: Synchrony Bank, Stamford, CT (US)

(72) Inventors: Jason Chen, Elk Grove Village, IL (US); Patrick Joseph Caraher, Munster, IN (US); Abha Kataria, New Delhi (IN); Darren Antoine Robinson, Chicago, IL (US); Derk Carel Doijer, Brooklyn, NY (US); Alex Muller, Chicago, IL (US); Michael Cook, West Haven, CT (US); James Oldham, Stamford, CT (US); Daniel Murphy, Norwalk, CT (US); Amanda Schaufler, Bronxville, NY (US); Timothy Christensen, Newtown, CT (US); Amable De Los Santos, West New York, NJ (US)

(73) Assignee: SYNCHRONY BANK, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,696

(22) Filed: Jul. 20, 2021

(65) Prior Publication Data
US 2022/0051220 A1 Feb. 17, 2022

Related U.S. Application Data

(63) Continuation of application No. 17/100,064, filed on Nov. 20, 2020, now Pat. No. 11,100,488, which is a
(Continued)

(51) Int. Cl.
*G06Q 20/24* (2012.01)
*G06F 9/54* (2006.01)
(Continued)

(52) U.S. Cl.
CPC ............ *G06Q 20/24* (2013.01); *G06F 9/451* (2018.02); *G06F 9/54* (2013.01); *G06Q 20/2295* (2020.05);
(Continued)

(58) Field of Classification Search
CPC .. G06Q 20/24; G06Q 20/2295; G06Q 20/322; G06Q 40/025; G06F 9/451; G06F 9/54; G06F 9/4484; G06F 2209/541
See application file for complete search history.

(56) References Cited

U.S. PATENT DOCUMENTS 6,993,572 B2 1/2006 Ross, Jr. et al.
2012/0324365 A1* 12/2012 Momchilov ............ H04L 67/01
715/738

(Continued)

FOREIGN PATENT DOCUMENTS

CN 103180822 B * 5/2016 ........... G06F 9/4443
KR 20140115040 A1 9/2014
(Continued)

OTHER PUBLICATIONS

Costa, Paolo, et al. "Camdoop: Exploiting In-network Aggregation for Big Data Applications." NSDI. vol. 12. 2012. (Year: 2012).*
(Continued)

*Primary Examiner* — Virpi H Kanervo
(74) *Attorney, Agent, or Firm* — Polsinelli LLP

(57) ABSTRACT

The electronic device may invoke a host application. The device may display a first host user interface on the display, the first host user interface including a first host user interface component associated with a child application. In
(Continued)

response, the device may invoke, using the host application, the child application executed at the electronic device. The device may transmit, using the host application, a request for data associated with a child user interface component to the child application. The device may transmit, using the child application, the request for data associated with the child user interface component to a child application server, wherein the data associated with the child user interface component is inaccessible by the host application. The device may receive, using the child application, the data associated with the child user interface component from the child application server. The device may display the child user interface component.

21 Claims, 25 Drawing Sheets

Related U.S. Application Data continuation of application No. 15/297,589, filed on Oct. 19, 2016, now Pat. No. 10,776,770.

(60) Provisional application No. 62/243,316, filed on Oct. 19, 2015.

(51) Int. Cl.
| | |
|---|---|
| *G06Q 20/32* | (2012.01) |
| *G06F 9/451* | (2018.01) |
| *G06Q 20/22* | (2012.01) |
| *G06Q 40/03* | (2023.01) |
| *G06F 9/448* | (2018.01) |

(52) U.S. Cl.
CPC ............ *G06Q 20/322* (2013.01); *G06Q 40/03* (2023.01); *G06F 9/4484* (2018.02); *G06F 2209/541* (2013.01)

(56) References Cited

U.S. PATENT DOCUMENTS

| | | | |
|---|---|---|---|
| 2013/0006848 | A1 | 1/2013 | Kuttuva |
| 2013/0091513 | A1 | 4/2013 | Jnderdal et al. |
| 2013/0346302 | A1 | 12/2013 | Purves et al. |
| 2014/0207575 | A1 | 7/2014 | Freed-Finnegan et al. |
| 2015/0256530 | A1 | 9/2015 | Semba |
| 2015/0319178 | A1 | 11/2015 | Desai |
| 2016/0042357 | A1 | 2/2016 | Ho |
| 2016/0162949 | A1 | 6/2016 | Malca et al. |
| 2016/0285884 | A1 | 9/2016 | Seaward et al. |
| 2017/0061138 | A1* | 3/2017 | Lambert ................. H04L 63/18 |
| 2017/0105122 | A1* | 4/2017 | Desai .................... H04L 67/025 |

FOREIGN PATENT DOCUMENTS

| | | | | |
|---|---|---|---|---|
| KR | 101451828 | B1 | 10/2014 | |
| KR | 20170029858 | A * | 3/2017 | ........... G06Q 20/206 |
| WO | 0152212 | A1 | 7/2001 | |
| WO | 2013134813 | A1 | 9/2013 | |
| WO | 2014194521 | A1 | 12/2014 | |

OTHER PUBLICATIONS

Notice of Allowance dated Apr. 4, 2022 in U.S. Appl. No. 16/926,047.
Mahmood et al., EvoDroid: Segemented Evolutionary Testing of Android Apps., FSE 2014: Proceedings of the 22nd ACM SIGSOFT International Symposium on Foundations of Software Engineering, Nov. 2014, pp. 599-609.
First Action Interview Pilot Program Pre-Interview Communication dated Feb. 18, 2021 in U.S. Appl. No. 17/100,132.
Notice of Allowance dated Apr. 29, 2021 in U.S. Appl. No. 17/100,132.
First Action Interview Pilot Program Pre-Interview Communication dated Feb. 3, 2021 in U.S. Appl. No. 17/100,064.
Notice of Allowance dated Apr. 21, 2021 in U.S. Appl. No. 17/100,064.
Office Action dated Sep. 28, 2021 in U.S. Appl. No. 16/926,047.
Xu Hong et al., The Distributed Data Integration and Performance Evaluation in Power Automation System, IEEE Conferences, Jan. 1, 2003, Proceedings of the Fourth International Conference on Parallel and Distributed Computing, Applications and Technologies, pp. 468-471.
Liu, Jun, et al., "Using the OPC Standard for Real-Time Process Monitoring and Control"; IEEE Software; Published by the IEEE Computer Society; 2005; pp. 54-59.
International Search Report and Written Opinion dated Jan. 19, 2017 in International Application PCT/US2016/057657.
Office Action dated May 2, 2019 in U.S. Appl. No. 15/297,589.
Office Action dated Jan. 30, 2020 in U.S. Appl. No. 15/297,589.
Notice of Allowance dated Apr. 16, 2020 in U.S. Appl. No. 15/297,589.
Notice of Allowance dated Feb. 7, 2023 in U.S. Appl. No. 17/387,161.
Bryan Ford, Structured Streams: a new Transport Abstraction, SIGCOMM'07, Aug. 27-31, 2007.
Office Action dated Oct. 20, 2022 in U.S. Appl. No. 17/387,161.

* cited by examiner

| Card | Activity | Payments | Offers | ... |

Review Terms & Conditions
RATES AND FEES TABLE
ROCKRED CREDIT CARD ACCOUNT

| Interest Rates and Interest Charges | |
|---|---|
| Annual Percentage Rate (APR) for Purchases | 26.99% |
| How to Avoid Paying Interest on Purchases | Your due date is at least 23 days after the close of each billing cycle. We will not charge you any interest on purchases if you pay your entire balance by the due date of each month. |
| Minimum Interest Charge | If you are charged interest, the charge will be no less than $2.00. |
| For Credit Card Tips from the Consumer Financial Protection Bureau | To learn more about factors to consider when applying for or using a credit card, visit the website of the consumer Financial Protection Bureau at http://www.consumerfinance.gov/learnmore. |
| FEES | |
| Penalty Fees • Late Payment | Up to $35 |

274 points to the APR row.

How We Will Calculate Your Balance: We use a method called "daily balance". The information about the costs of the Card described above is accurate as of October 1, 2015. This information may have changed after that date. To find out what may have changed, write to us at P.O Box 965009, Orlando, FL 32896 5009; Puerto Rico and U.S. Virgin Islands residents : P.O Box 364788, San Juan, PR 00936-4788. This application and the credit card account agreement will be governed by federal law and, to the extent state law applies, the laws of Utah, Subject to the requirements and limitations of applicable law, we may change, add to or delete any of the terms of the Agreement, including the interest rates, fees and charges and we will send you notice as required.

STATE NOTICES

CA Residents: If you are married, you may apply for a separate account.
NY Residents: A consumer credit report may be obtained in connection with evaluating your application and subsequently in connection with updates, renewals or extensions of credit for which this application is made. Upon your request, you will be informed whether a report was obtained, and if so, of the name and address of the consumer report agency.
OH Residents: The Other laws against discrimination require that all creditors make credit equally available to all credit worthy customers, and that credit reporting agencies maintain Accept & Submit — 276

FIG. 2Q

SYSTEM AND METHOD FOR INTEGRATING DATA FROM A REMOTE SERVER WITH A CLIENT APPLICATION

CROSS-REFERENCE TO RELATED APPLICATIONS

The present application is a continuation of U.S. patent application Ser. No. 17/100,064 filed Nov. 20, 2020, which is a continuation of U.S. patent application Ser. No. 15/297,589 filed Oct. 19, 2016 (now U.S. Pat. No. 10,776,770), which claims the benefit of U.S. Provisional Patent Application No. 62/243,316 filed Oct. 19, 2015, all of which are incorporated herein by reference in their entireties.

FIELD OF THE INVENTION

The present invention relates to computer systems in which and, more particularly, to computer systems employed in connection with integrating data with client applications.

SUMMARY

In one embodiment there is a method implemented at an electronic device configured to display user interfaces and user interface components on a display of the electronic device. The device may invoke a host application executed at the electronic device. The device may display, using the host application, a first host user interface on the display, the first host user interface including a first host user interface component associated with a child application separate and distinct from the host application. The device may, in response to a selection of the first host user interface component in the first host user interface by an end user, (i) invoke, using the host application, the child application executed at the electronic device; (ii) transmit, using the host application, a request for data associated with a child user interface component to the child application; (iii) transmit, using the child application, the request for data associated with the child user interface component to a child application server connected to the child application, wherein the data associated with the child user interface component is inaccessible by the host application; (iv) receive, using the child application, the data associated with the child user interface component from the child application server; and (v) display the child user interface component on the display.

In one embodiment, there is an electronic device comprising a display; one or more memory units each operable to store at least one program; and at least one processor communicatively coupled to the one or more memory units, in which the at least one program, when executed by the at least one processor, causes the at least one processor to perform one or more steps. The processor may invoke a host application executed at the electronic device. The processor may display, using the host application, a first host user interface on the display, the first host user interface including a first host user interface component associated with a child application separate and distinct from the host application. The processor may, in response to a selection of the first host user interface component in the first host user interface by an end user: (i) invoke, using the host application, the child application executed at the electronic device; (ii) transmit, using the host application, a request for data associated with a child user interface component to the child application; (iii) transmit, using the child application, the request for data associated with the child user interface component to a child application server connected to the child application, wherein the data associated with the child user interface component is inaccessible by the host application; (iv) receive, using the child application, the data associated with the child user interface component from the child application server; and (v) display the child user interface component on the display.

In one embodiment, there is a non-transitory computer readable storage medium having stored thereon computer-executable instructions which, when executed by a processor, perform one or more steps at an electronic device configured to display user interfaces and user interface components on a display of the electronic device. The processor may invoke a host application executed at the electronic device. The processor may display, using the host application, a first host user interface on the display, the first host user interface including a first host user interface component associated with a child application separate and distinct from the host application. The processor may, in response to a selection of the first host user interface component in the first host user interface by an end user: (i) invoke, using the host application, the child application executed at the electronic device; (ii) transmit, using the host application, a request for data associated with a child user interface component to the child application; (iii) transmit, using the child application, the request for data associated with the child user interface component to a child application server connected to the child application, wherein the data associated with the child user interface component is inaccessible by the host application; (iv) receive, using the child application, the data associated with the child user interface component from the child application server; and (v) display the child user interface component on the display.

In some embodiments, the child user interface component is a child user interface displayed and controlled by the child application and data displayed on the child user interface and data received via the child user interface is inaccessible by the host application.

In some embodiments, the host application is a retailer-specific application, the child application is a financial services application, the child user interface is a financial services user interface displayed and controlled by the financial services application, the financial services user interface displays data associated with a retailer-specific financial account associated with the end user, and the data associated with the retailer-specific financial account associated with the end user is inaccessible by the retailer-specific application.

In some embodiments, displaying the child user interface component includes: providing, using the child application, the data associated with the child user interface component to the host application; generating the child user interface component based on the data associated with the child user interface component; and displaying, using the host application, the child user interface component on the display.

In some embodiments, the host application is a retailer-specific application, the child application is a financial services application, and the data associated with a child user interface component includes data associated with a retailer-specific credit account. In response to a determination that the data associated with the retailer-specific credit account meets end-user-specific offer criteria, displaying the child user interface component includes displaying a first offer to the end user to use the retailer-specific credit account to make a purchase; and in response to a determination that the data associated with the retailer-specific credit account does not meet end-user-specific offer criteria, displaying the child user interface component includes displaying a second offer to the end user to request a credit limit increase for the retailer-specific credit account to make a purchase.

In some embodiments, the child application is configured to receive personal information provided by the end user, where the personal information is inaccessible by the host application, and the request for data associated with the child user interface component transmitted from the child application includes the personal information provided by the end user.

In some embodiments, the data associated with the child user interface component received by the child application from the child application server is based on the personal information provided by the end user that is inaccessible by the host application.

BRIEF DESCRIPTION OF THE SEVERAL VIEWS OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DETAILED DESCRIPTION

Figure 1:
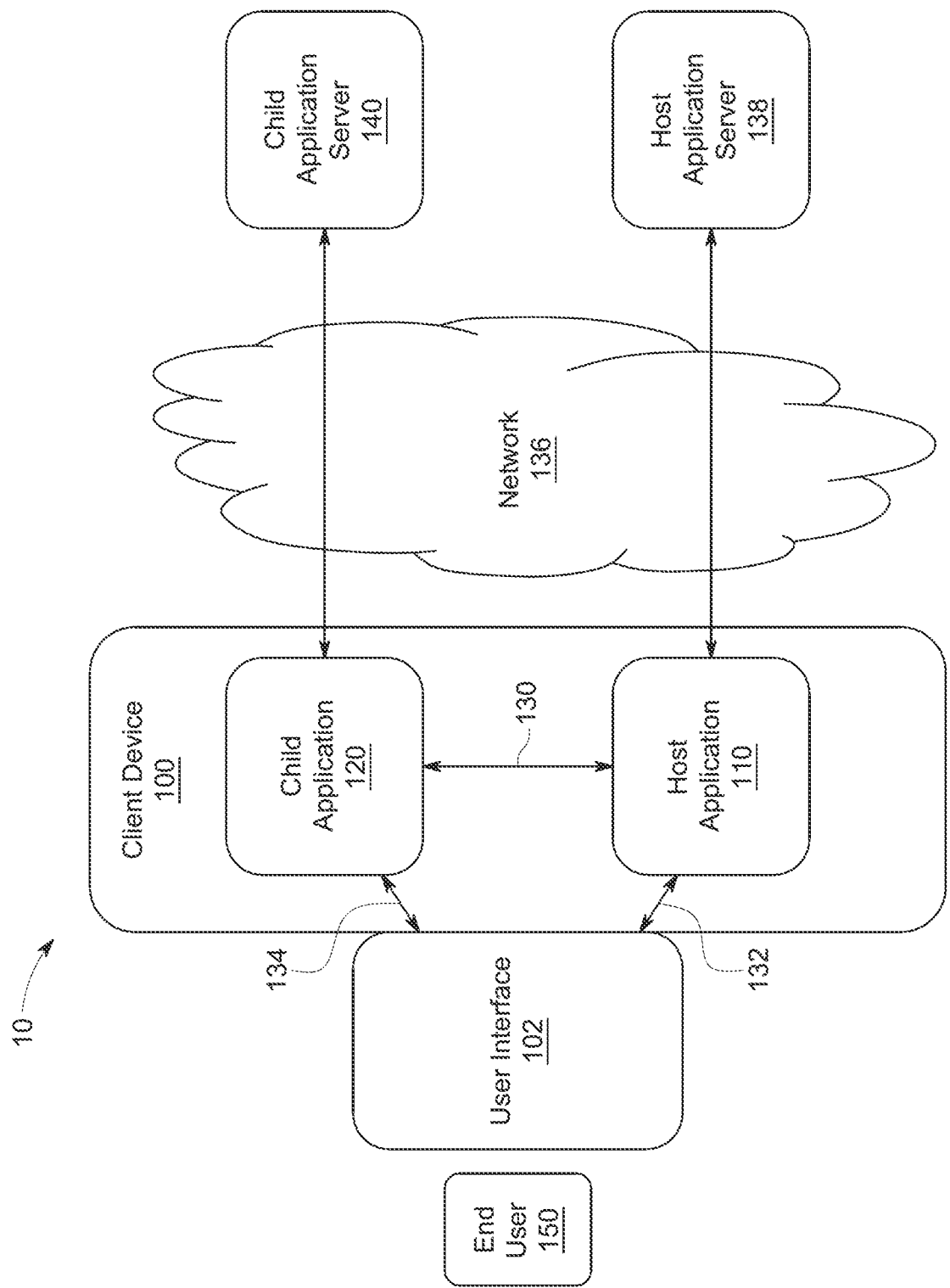
FIG. 1 is a block diagram illustrating an exemplary computer architecture used in connection with carrying out the present invention.

As a result of the ubiquity of mobile phones and mobile applications, every day thousands of data exchanges occur online that involve personal data. These data exchanges may occur between a user and a mobile application or between a mobile application and a backend server. These exchanges of personal data can be helpful. For example, a user may purchase goods or services or access banking information using different mobile applications. However, each time a data exchange occurs, the personal data of a user is exposed to third parties resulting in an increased chance of the personal data being compromised.

For example, if a user attempts to purchase a product via a retailer's mobile application, the user will generally submit personal banking information, such as a credit/debit account number to the retailer's mobile application. In turn, the mobile application will transmit the personal banking information to the retailer's transaction processing servers. From there, the retailer's transaction processing servers will verify the personal banking information with the bank issuing the credit/debit card and complete the transaction. During this process, the user's personal banking information is exposed to the retailer's mobile application and the retailer's transaction processing servers. While most retailers act in good faith, each exposure presents a risk that the user's personal information will be compromised.

In a further example, retailers may desire to enhance their mobile applications by customizing the user experience. For example, the retailer may want to offer certain discounts or coupons based on a user's personal information. Generally, the retailer can utilize user information acquired from the user directly, such as user demographics information or prior shopping behavior tracked and recorded via the mobile application. However, having access to additional user personal information, such as available credit on a financial account that was not acquired directly from the user, can substantially increase the likelihood that the user makes a purchase using the retailer's mobile application by allowing a retailer to provide targeted offers to the user. A retailer could request access to this personal information from the user directly via the retailer's mobile application by requesting personal identification information of the end user to access the financial information. However, again, while most retailers act in good faith, each exposure of personal information presents a risk that the user's personal information will be compromised.

In a further example, retailers may offer retailer-specific credit cards (i.e., store-branded credit cards that can only be used at that store) to its customers. These credit cards are generally managed by third-party financial institutions (e.g., private label credit cards). In conventional systems, a user may need to access both a retailer application to access retailer-specific services and a separate financial institution application to manage the retailer-specific credit account hosted by the financial institution. Navigating between different applications can be a time-consuming process, which could result in fewer users adopting the retailer-specific credit cards.

At least some embodiments of the present invention are disclosed that protect a user's personal information from being compromised by a host application (e.g., a retailer application) by integrating features from a child application (e.g., a financial institution application) into the host application while simultaneously preventing exposure of a user's personal information to the host application. In some embodiments, the host application invokes a child application that accesses and/or processes the personal information of the user. The child application then provides data to the host application for display on the display interface of a client device while also segmenting the user's personal information from the host application. These embodiments describe an integration concept where a child application is executed by a host application and control of a user interface is transferred between the host application and the child application. In these embodiments, the child application is encoded binary, not source code, meaning that the second application cannot be modified by the host application before, during or after execution. These embodiments generally improve the security functionality of a computer by providing a series of controlled access points in a computer application for a user to provide sensitive personal information without exposing the user's personal information to an unknown and unverified third party. One benefit of allowing the child application to display data and interact with the user is for enhanced security. In this modality, no data is transferred between the host and child application. Therefore, the child application may display sensitive content to the user in the form of personal identification information (PII) data or Payment Card Industry (PCI) data, without storing or transmitting such data to the host application. In addition, the child application can implement its encryption and security model for temporarily storing and transmitting the data to third parties. These embodiments also ensure that the host application will not break the security model established by the child application developer. Such an implementation also minimizes work performed by the host application developer because the developer does not need to develop corresponding host application user interfaces for child application data. Overall, these embodiments lead to a lower burden of testing and oversight into the host application development process and resulting source code.

This type of integration can be used in a number of different environments or industries, including retailing, manufacturing, health care, or other environments that can utilize a customer-facing application. For example, using this functionality, a retailer can provide a native credit experience that seamlessly inserts credit functionality into a retailer shopping application without disrupting the branding of the retailer shopping application. Other examples include digital service providers who provide solutions that can be embedded within third party applications, and loyalty providers who can extend advertising to other retailer's applications. As another example, a car dealer with multiple dealerships might provide a dealership parent application to its customers while also using a car manufacturer child application, where the car manufacturer child application provides the details on cars for display on the user device when the user initiates use of the dealership parent application.

Exemplary System Embodiments

FIG. 1 illustrates an exemplary block diagram of a system 10 for extending functionality of a host application using data that is inaccessible to the host application, according to at least some embodiments of the invention. In this example, the system 10 includes a client device 100, a host application server 138 and a child application server 140 to interface with an end user 150.

The client device 100 may be any computing device configured to interface with the end user 150 and/or the servers 138 and 140. Examples of the client device 100 may include a smart phone, tablet or a personal computer, among others.

In the embodiment as shown, the client device 100 includes a user interface 102 to receive inputs from and display data to the end user 150. Examples of the user interface 102 include touch screens, and monitors with peripheral components such as a keyboard and mouse, among other things.

In the embodiment as shown, the client device 100 includes a host application 110 to generate graphical user interfaces for display to the end user 150. As used herein, the host application 110 may be any executable computer application (other than computer applications executed by the operating system of the client device 100) that interacts with the end user 150 via a user interface. For example, in some embodiments, the host application 110 may be a retailer application to execute functionality offered pursuant to an application of a retailer. By way of example, the retailer application 100 may be programmed to execute functionality involving shopping, commerce, or a store locator, among others.

The host application 110 may receive user inputs from the end user 150 via the user interface 102. Alternatively, the host application 110 may request data from the host application server 138 and/or a child application 120 for display via the user interface 102.

The host application server 138 may be any computing device configured to manage access to a centralized resource or service in a network. In some embodiments, the host application server 138 may provide data resources to facilitate the host application 110 with providing graphical user interfaces to the end user 150. For example, the host application server 138 may host retailer data used for shopping or commerce, among others. The retailer data may include retailer user interfaces displayable on the user interface 102 to aid the end user 150 during a shopping experience with the host application 110. The retailer data may also include product information, such as product description and pricing information.

In the embodiment as shown, the client device 100 includes the child application 120, referenced above. As used herein, the child application 120 may be any executable computer application (other than computer applications executed by the operating system of the client device 100) invoked by the host application 110 that interacts with the end user 150 via a user interface. In some embodiments, the child application 120 provides additional functionality (e.g., providing services) that is not provided by the host application 110. For example, in some embodiments, the child application 120 may be a financial services application that provides financial services that extend functionality of an application of a retailer. By way of example, the child application 120 may be programmed to execute additional financial services of the host application 110 specific to the end user 150, such as accessing and displaying financial account information, transaction history, credit or fund availability on a bank account, payment processing, and digital receipt information, among others.

In some embodiments, the child application 120 may request data associated with the personal information of the end user 150 from a child application server 140 to integrate with graphical user interfaces. The child application server 140 may be any computing device configured to manage access to a centralized resource or service in a network. In some embodiments, the child application server 140 may provide data resources to facilitate the child application 120 with providing graphical user interfaces to the end user 150. For example, the child application server 140 may be associated with a financial institution and may host, for the end user 150, personal information including financial account information, transaction history, credit or fund availability on a bank account, payment processing, digital receipt information from a financial institution.

In some embodiments, when requested by the host application 110, the child application 120 controls the display on the user interface 102. In these embodiments, the child application 120 may display personal information of the end user 150 inaccessible to and unmodifiable by the host application 110. For example, the child application 120 may provide graphical user interfaces related to accessing financial account information or purchasing a product offered by the retailer using the financial account information. Examples of graphical user interfaces provided by the child application 120 include shopping cart or payment UIs that are specifically linked to a financial account of the end user 150 with a specific financial institution. With this functionality implemented, the child application 120 can ensure that the personal information of the end user 150 will not be compromised by the host application 110, either inadvertently or intentionally, thereby improving the security functionality of the computer. Ultimately, the fewer the number of companies that have access to personal information, the less chance that the information can be compromised.

In some embodiments, when requested by the host application 110, the child application 120 may provide data associated with personal information that is otherwise inaccessible to the host application 110. In these embodiments, the host application 110 is providing a graphical user interface to the end user 150. For at least one of the user interface objects displayed to the end user 150 on the graphical user interface, the child application 120 provides data associated with the graphical user interface object. The data may be a graphical user interface object itself or data that can be processed by the host application 110 to generate a graphical user interface object.

In some embodiments, the data provided by the child application 120 to the host application 110 includes data based on, associated with or generated from personal information of the end user 150 that is inaccessible to the host application 110. For example, the host application 110 may desire to offer a discount or coupon that, if redeemed by the end user 150, reduces the purchase price for an object. The discount or coupon may be based on personal information, such as credit availability, personal banking information, end user behavioral information (e.g., prior purchasing habits), and/or end user demographic information that is inaccessible to the host application 110 without the child application 120. For example, if a user has $100 of available credit on a financial account, a retailer may desire to offer the end user a $10 off coupon for any purchase between $50 and $100 dollars using a host application 110. This type of offer may be enticing for a user with $100 of available credit, but in other cases, where the user less than $50 of available credit, the user will not be able to redeem the offer because the user does not have access to sufficient funds to redeem the offer. In this case, the retailer may desire to offer a different discount, such as $5 off a purchase of $30 or more. By having access to available credit information on a financial account provided by the child application 120, the retailer can provide user-specific offers to the end user 150 that have a greater likelihood of being redeemed. This type of functionality can be implemented by a host application 110 for a retailer without the end user 150 having to provide any personal information to the retailer via the host application 110, such as personal identification information to access the financial account information. By preventing a retailer's access to personal information, while still allowing the retailer to provide targeted offers to the end user, the end user can protect personal information while still receiving enhanced functionality (e.g., targeted offers) from the retailer. These embodiments represent an improvement to the security functionality of a computer because the personal information of the end user 150 cannot be compromised by the host application 110. On the other hand, conventional implementations risk compromising personal information of users by having host applications directly request access to a user's personal information in order to provide targeted offers.

The host application 110 and child application 120 exchange data with the user interface 102 via connection lines 132 and 134, respectively. Using the connection lines 132 and 134, the host application 110 and child application 120 can control the user interface 102 by transmitting user interface data to the user interface 102. Upon receipt, the user interface 102 generates a graphical user interface on a display for the end user 150. The user interface 102 may receive user inputs from the user and transmit data representative of the user inputs to the host application 110 and the child application 120 via connection lines 132 and 134, respectively.

The host application 110 and the child application 120 exchange data via connection line 130. Using the connection line 130, the host application 110 can request the child application 120 to control of the user interface 102. As discussed herein, by transferring control of the user interface 102, the child application 120 can interact with the end user 150 so that the end user 150 can provide personal information without fear of access by the host application 110. Using the connection line 130, the host application 110 can request data associated with the personal information of the end user 150 from the child application 120. The child application 120 can provide data associated with the personal information of the end user 150 to the host application 110. In some embodiments, connection line 130 provides bidirectional communication between the host application 110 and the child application 120 and resides entirely on the client device 100.

The host application 110 connects to the host application server 138 and the child application 120 connects to the child application server 140 via network 136. Network 136 connects the devices or components by carrying signals. Network 136 may be implemented using wire or cable, fiber optics, a phone line, a wireless link, a cellular phone link, a radio frequency link, or any other suitable communication channel. For instance, network 136 may be implemented using a combination of channels. Network 136 may be implemented as an intranet and/or an internet.

Exemplary User Interfaces

FIGS. 2A-2L illustrate exemplary user interfaces for extending functionality of a host application on an electronic device by providing additional services using data that is inaccessible to the host application, according to at least some embodiments of the invention.

In these embodiments, the host application 110 is a retailer application that sells goods or services to customers. In this example, the retailer application 110 is associated with a fictional retailer known as "Rock Red," a clothing company that sells clothing-related merchandise. The retailer application 110, in conjunction with host application server 138, provides one or more user interfaces to the end user 150 via user interface 102.

In these embodiments, the retailer application 110 is implemented on a mobile device (i.e., the client device 100). To start the process, the end user 150 opens retailer application 110, for example, by selecting an icon (not shown) representing the retailer application 110 on the end user's mobile device 100. In response, the retailer application 110 displays a home page, as shown in exemplary FIG. 2A, on a user interface 102. In this example, the user interface 102 is a touchscreen.

Figure 2A:
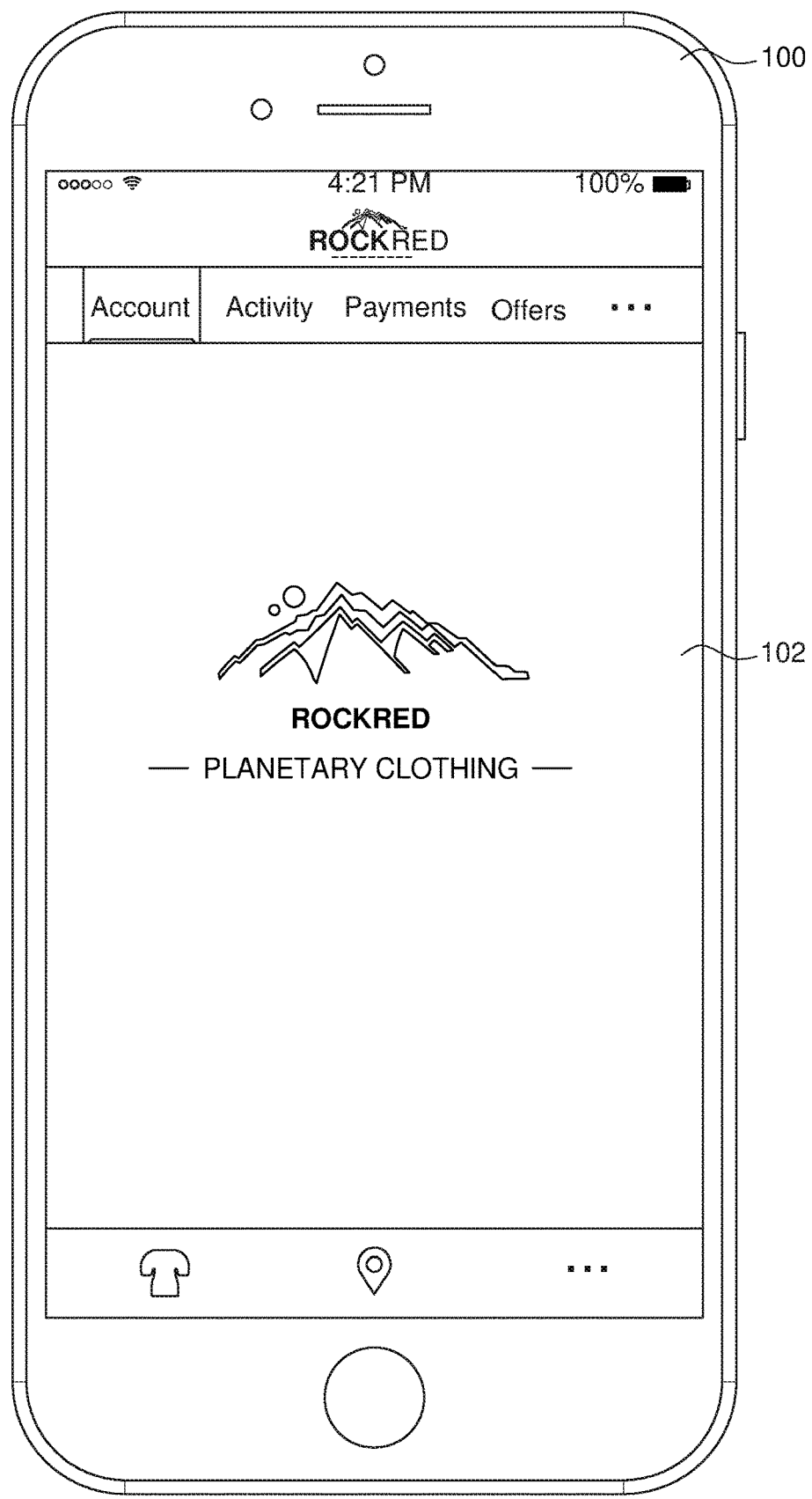
FIGS. 2A-2T illustrate exemplary user interfaces for extending functionality of a host application on an electronic device by providing additional financial services using data that is inaccessible to the host application, according to at least some embodiments of the invention.
Figure 2B:
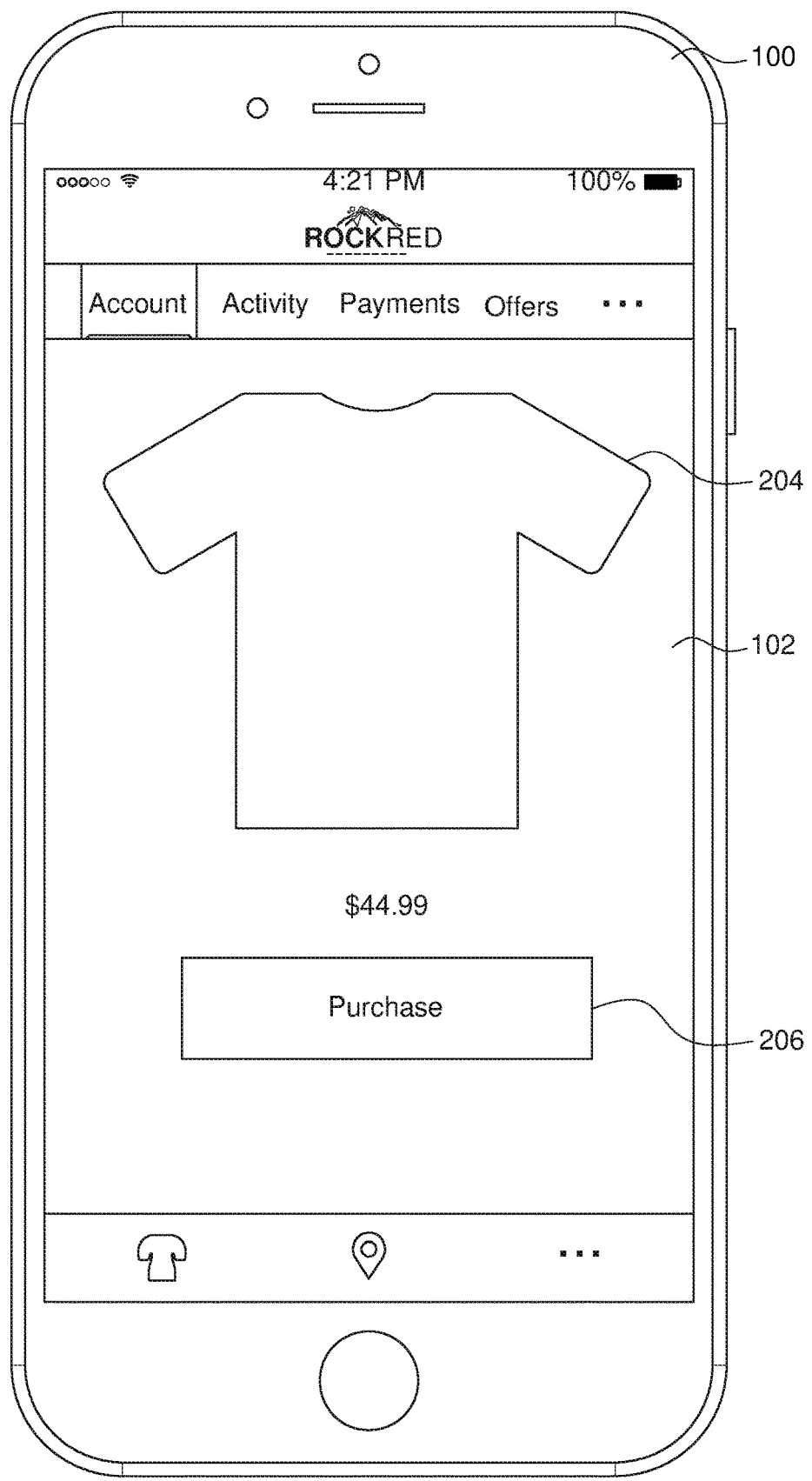

The end user 150 may navigate through one or more user interfaces of retailer application 110 to shop for clothing merchandise that the end user 150 is interested in purchasing. As shown in FIG. 2B, the user may navigate to a user interface of the retailer application 110 showing a shirt that the user would like to purchase. FIG. 2B includes an image 204 of the shirt and a selectable purchase button 206. After the end user 150 decides to purchase the shirt, the end user 150 selects the purchase button 206.

Figure 2C:
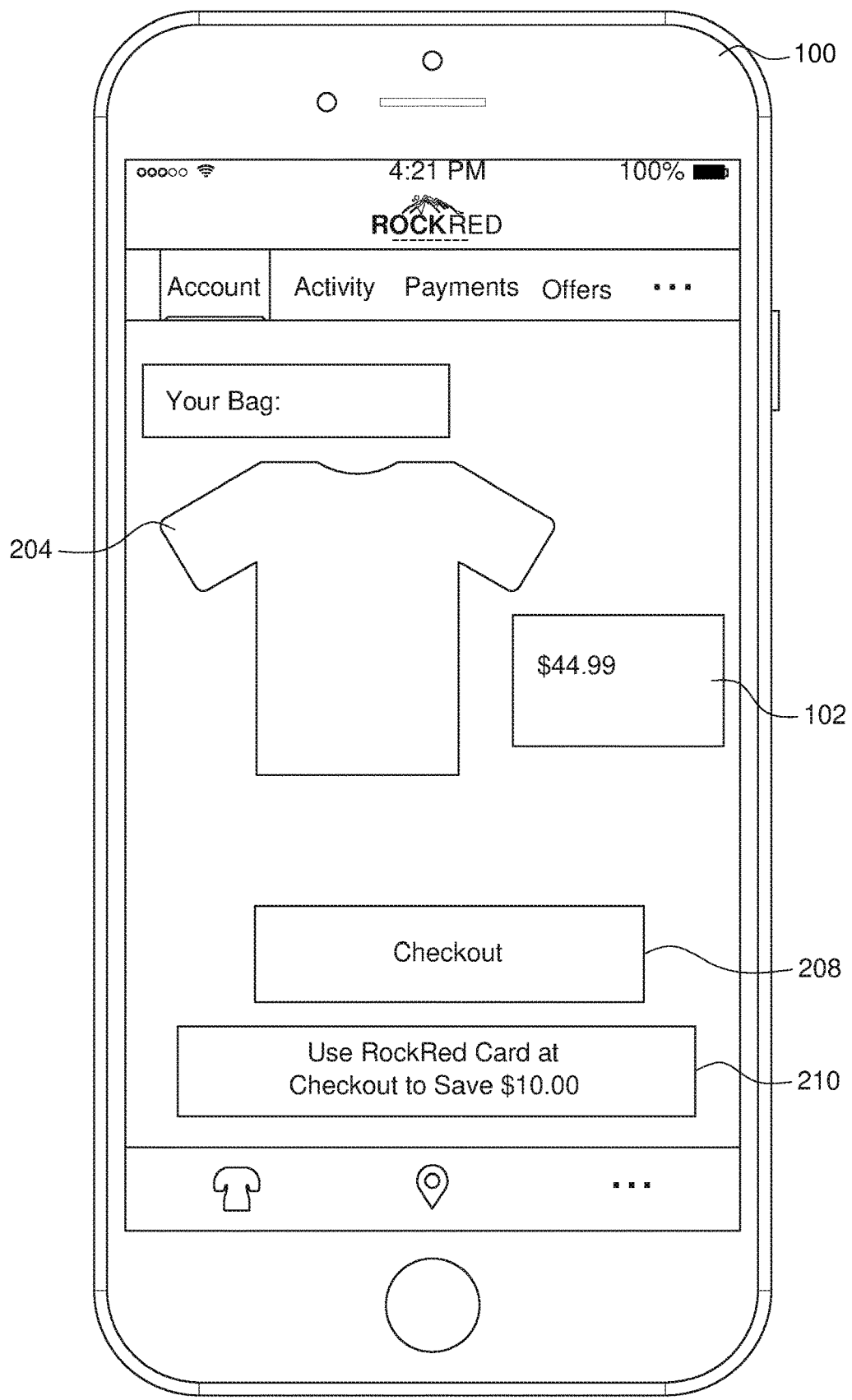
Figure 2D:
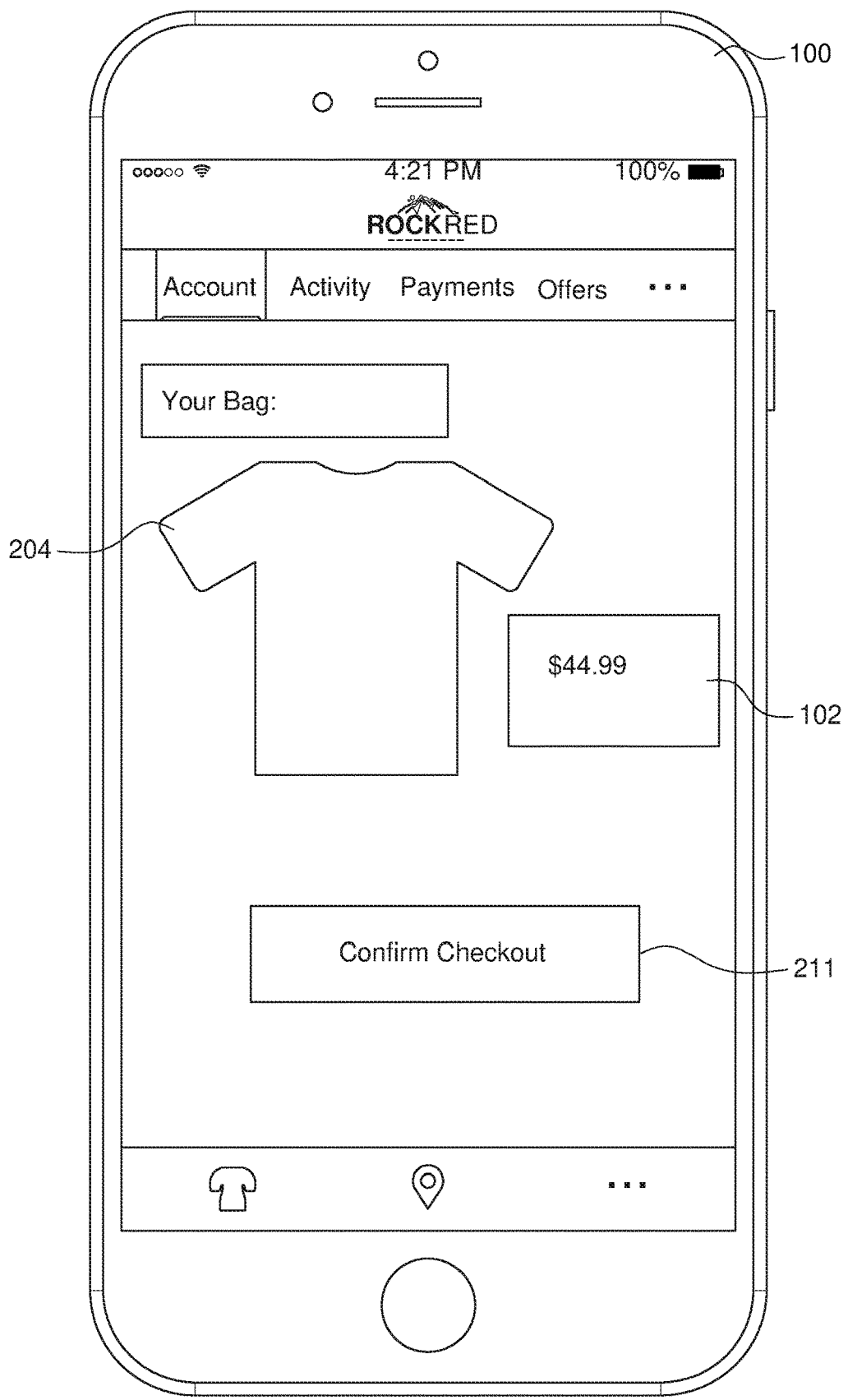

In response, the retailer application 110 displays a checkout user interface, as shown in exemplary FIG. 2C, to complete the transaction. In some embodiments, the retailer application 110 may include financial services functionality, such as a checkout page including a first checkout button 208 that, if selected, allows the end user 150 to provide financial account information via subsequent user interfaces to complete the purchasing transaction. Once the end user 150 provides the financial account information, the retailer application 110 displays a confirm transaction user interface, as shown in exemplary FIG. 2D. Upon selection of the confirm checkout button 211 by the end user 150, the transaction is verified and completed. However, as described herein, if the end user 150 provides personal information (e.g., a credit card number) to the retailer application 110, it is possible that the personal information could be compromised. To address this concern, in some embodiments, the retailer application 110 can provide an alternative checkout process that includes extended financial services functionality. In these embodiments, the retailer application 110 provides a second checkout button 210, as shown in FIG. 2C, that allows a user to complete the purchasing transaction using a retailer-specific credit card linked to a financial institution. In this example, the retailer-specific credit card is a "RockRed Card." Upon selection of the second checkout button 210, the retailer application 110 invokes a child application 120 that provides extended financial services of the financial institution to complete the purchasing process. In this embodiment, the child application 120 is an exemplary financial services application hosted by the financial institution. The retailer application 110 then transfers control of the touchscreen 102 to the financial services application 120.

In response to the transfer of control from the retailer application 110, the financial services application 120 requests data associated with a financial services user interface from child application server 140. In this example, the child application server 140 is a financial services server. The financial services server 140 provides data associated with a retailer-specific financial account of the end user 150 hosted by a financial institution. This data includes user interfaces to complete a transaction.

Figure 2E:
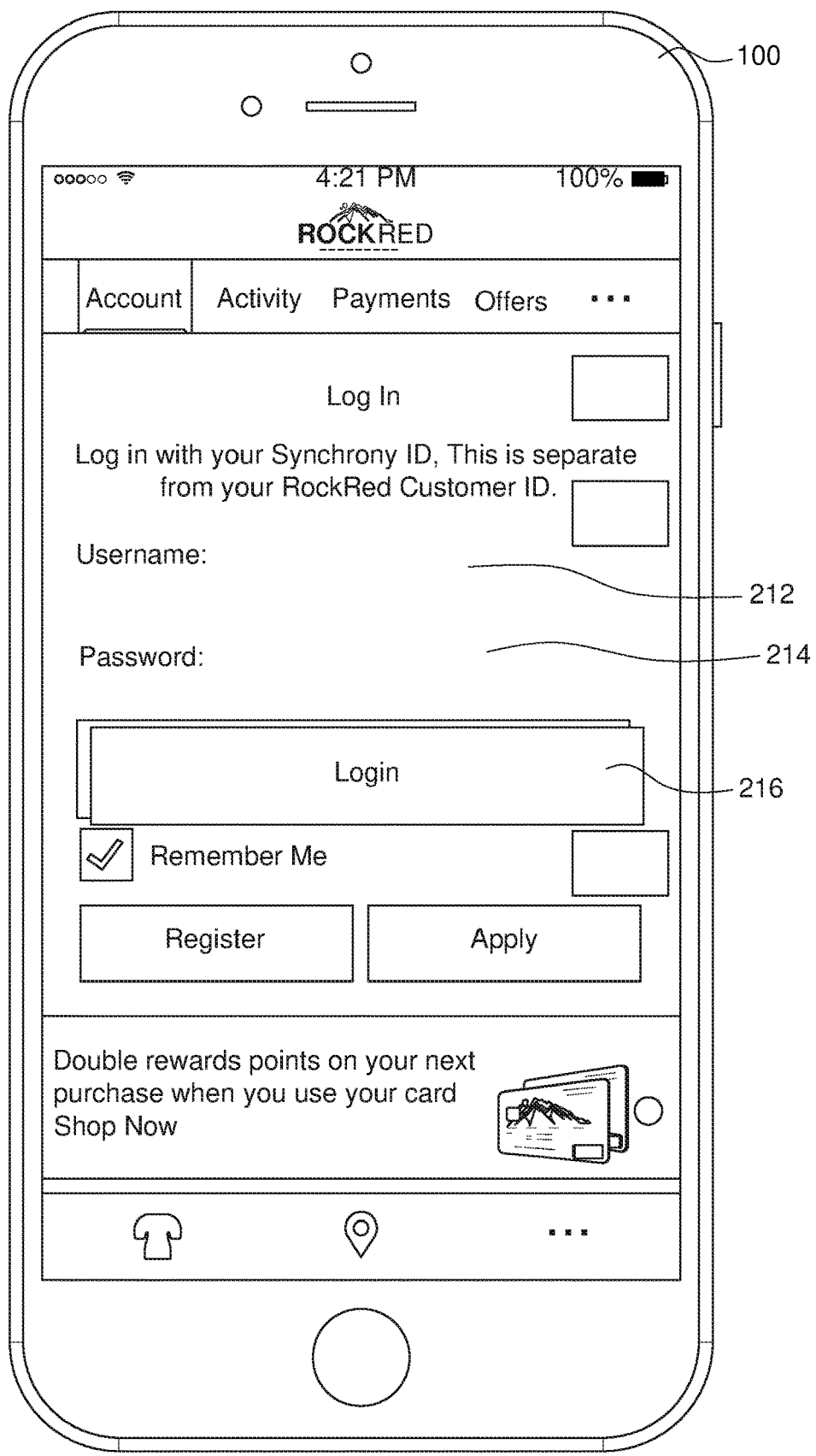

Initially, as shown in FIG. 2E, the financial services application 120 displays a login user interface on the touchscreen 102. The user is prompted to enter personal identification information, i.e., a username at field 212 and a password at field 214. Upon completion, the user can select a login button 216 to login to the financial services application 120. While this embodiment includes a login user interface, it is contemplated that the login user interface may be optional, as a user may have previously provided personal identification information.

Logging in to the financial services application 120 allows for the secure access of the end user's information stored by the financial services server 140 of the financial institution and use of such information in connection with the retailer application 110. More particularly, financial services application 120 makes a call to the financial services server 140 of the financial institution. The call includes user credentials, i.e., a user name and password inputted during log in, and an identifier of the mobile device 150 being used by the end user. The security comes from both the user name and password and the ability to identify key attributes about the end user 150.

In some embodiments, the financial services application 120 may use device fingerprinting (e.g., accessing a device identifier) to provide an additional factor for authentication. In some embodiments, the financial services application 120 auto generates the device identifier and stores it locally within an encrypted storage.

In some embodiments, if the end user 150 has already logged into the financial services application 120, then the financial services application 120 can forego display of the login user interface.

Figure 2F:
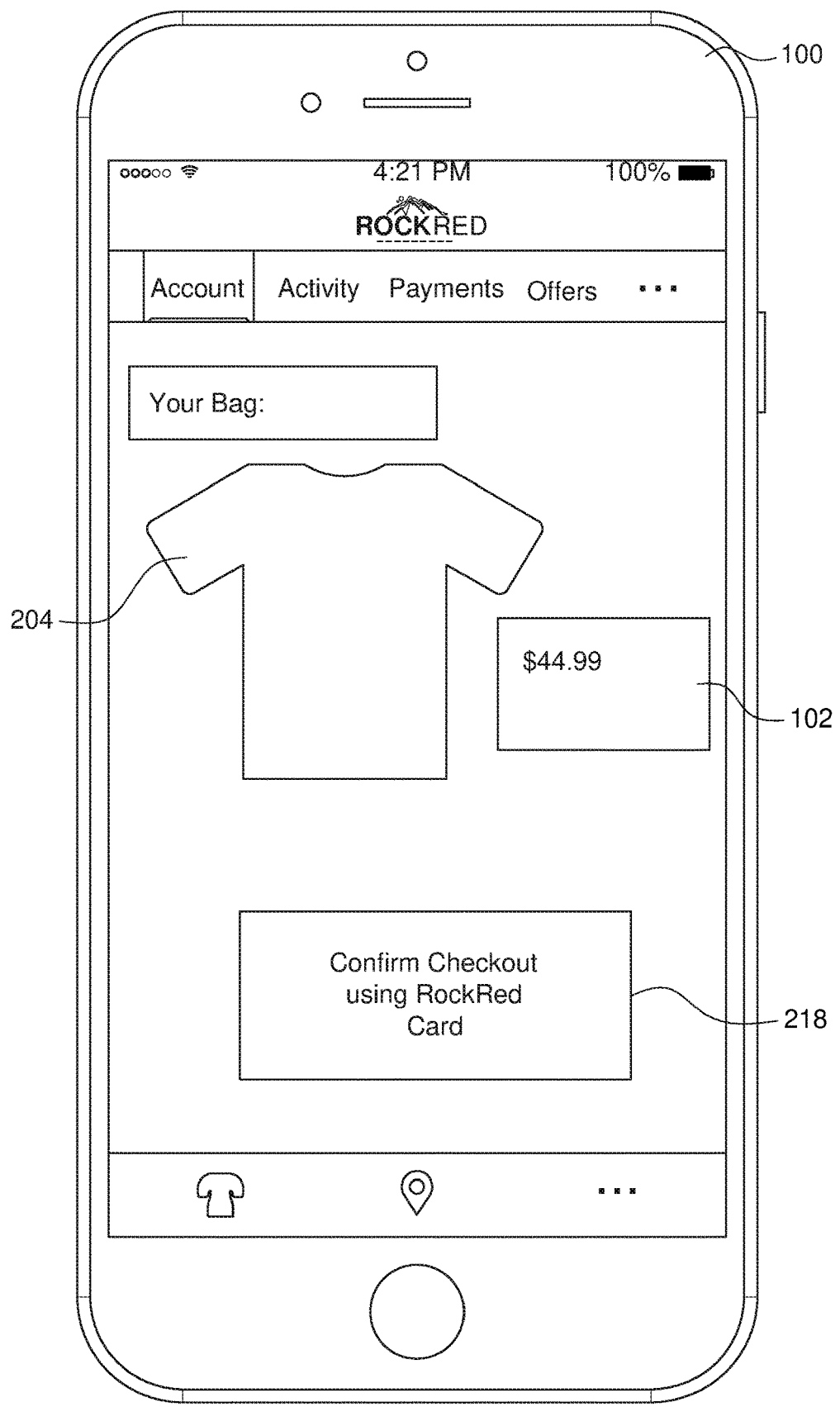
Figure 2G:
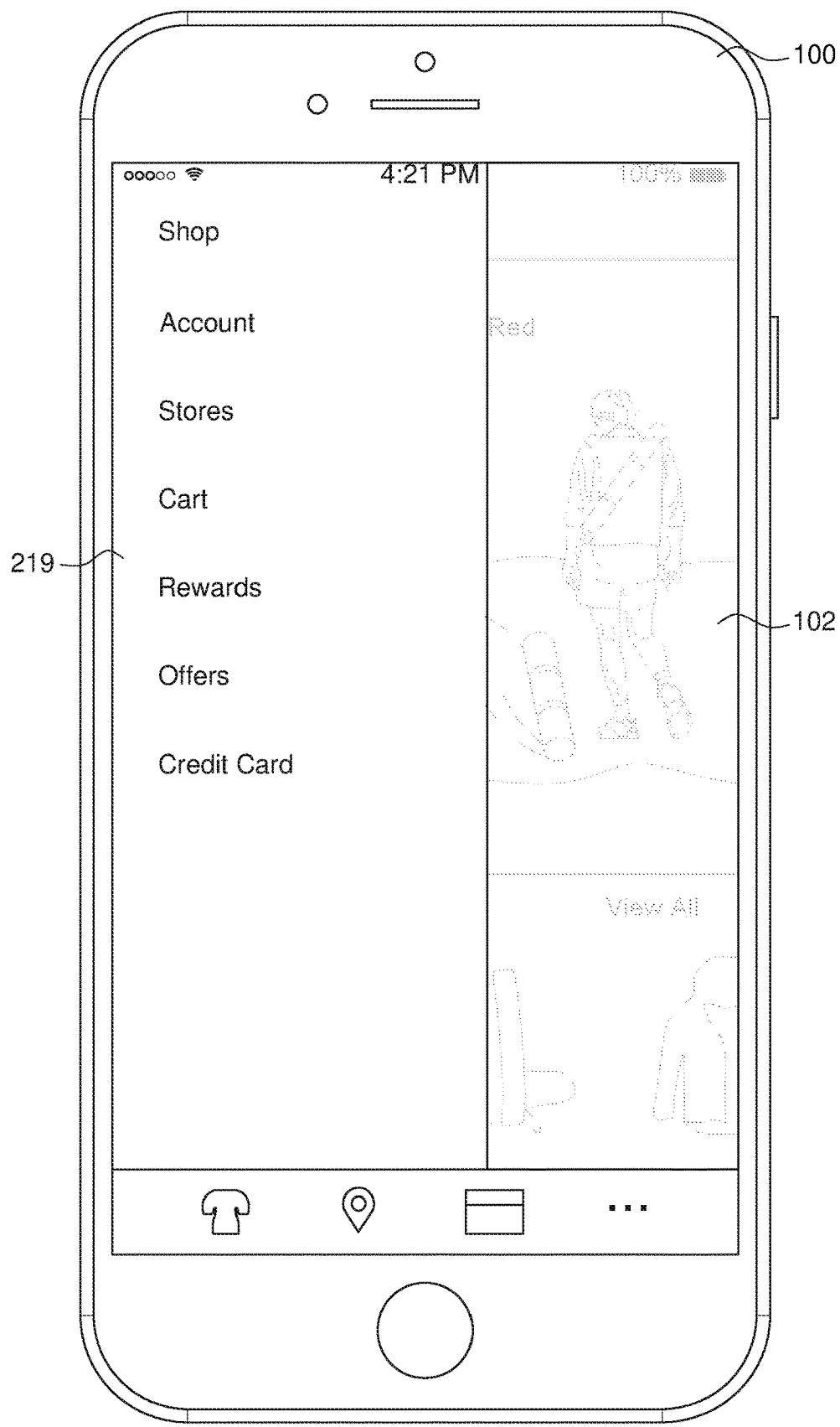
Figure 2H:
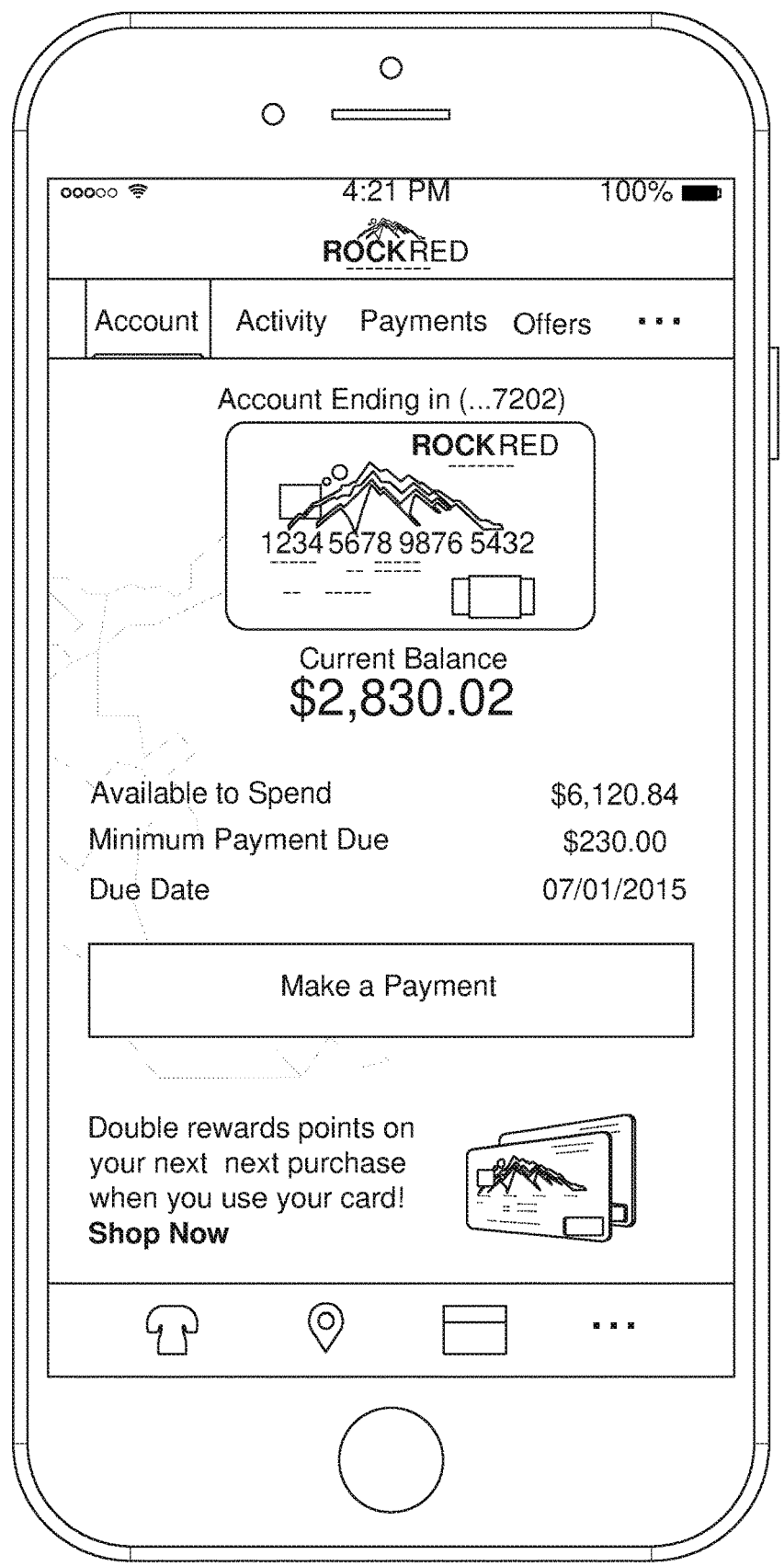
Figure 2I:
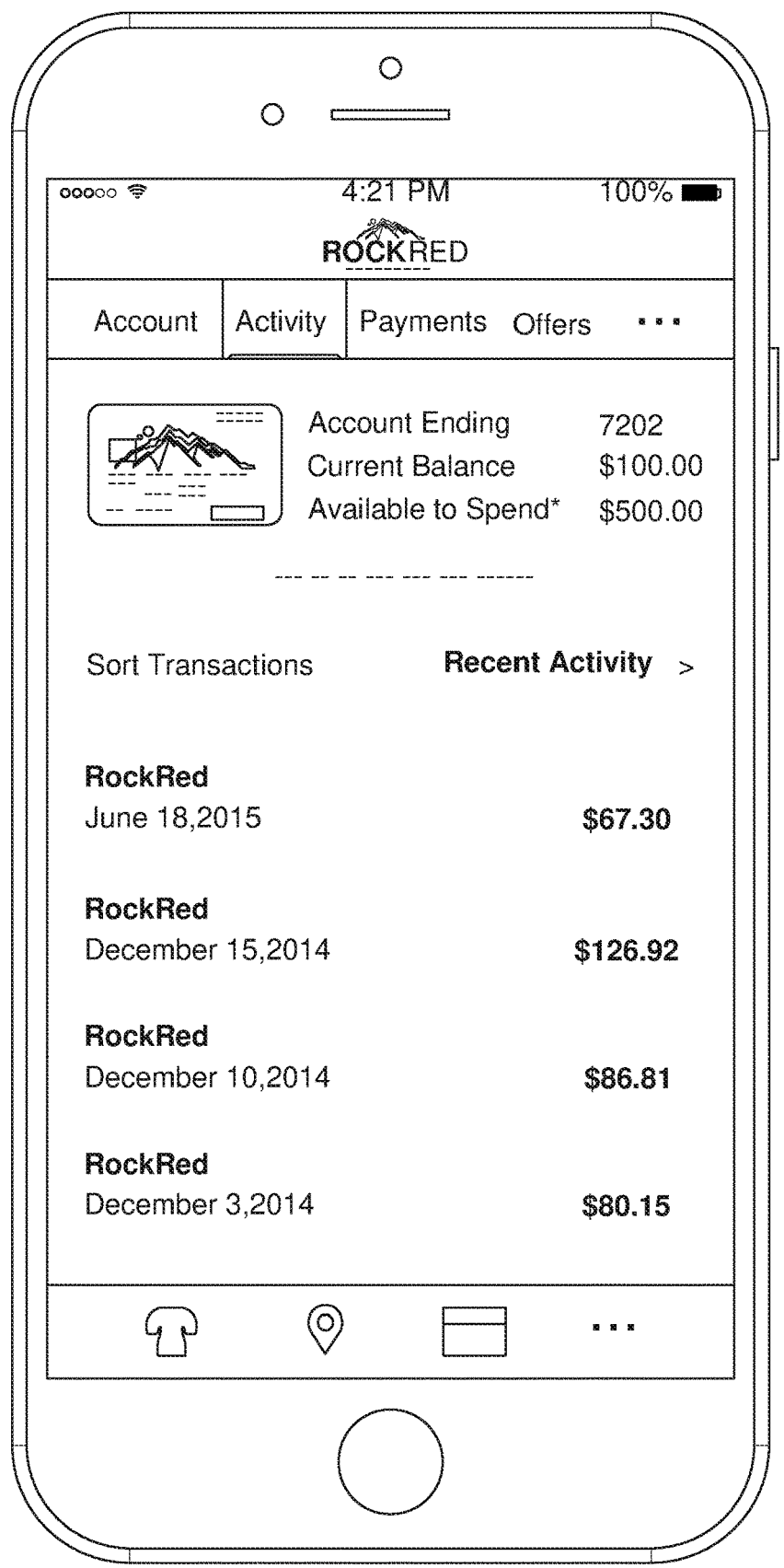
Figure 2J:
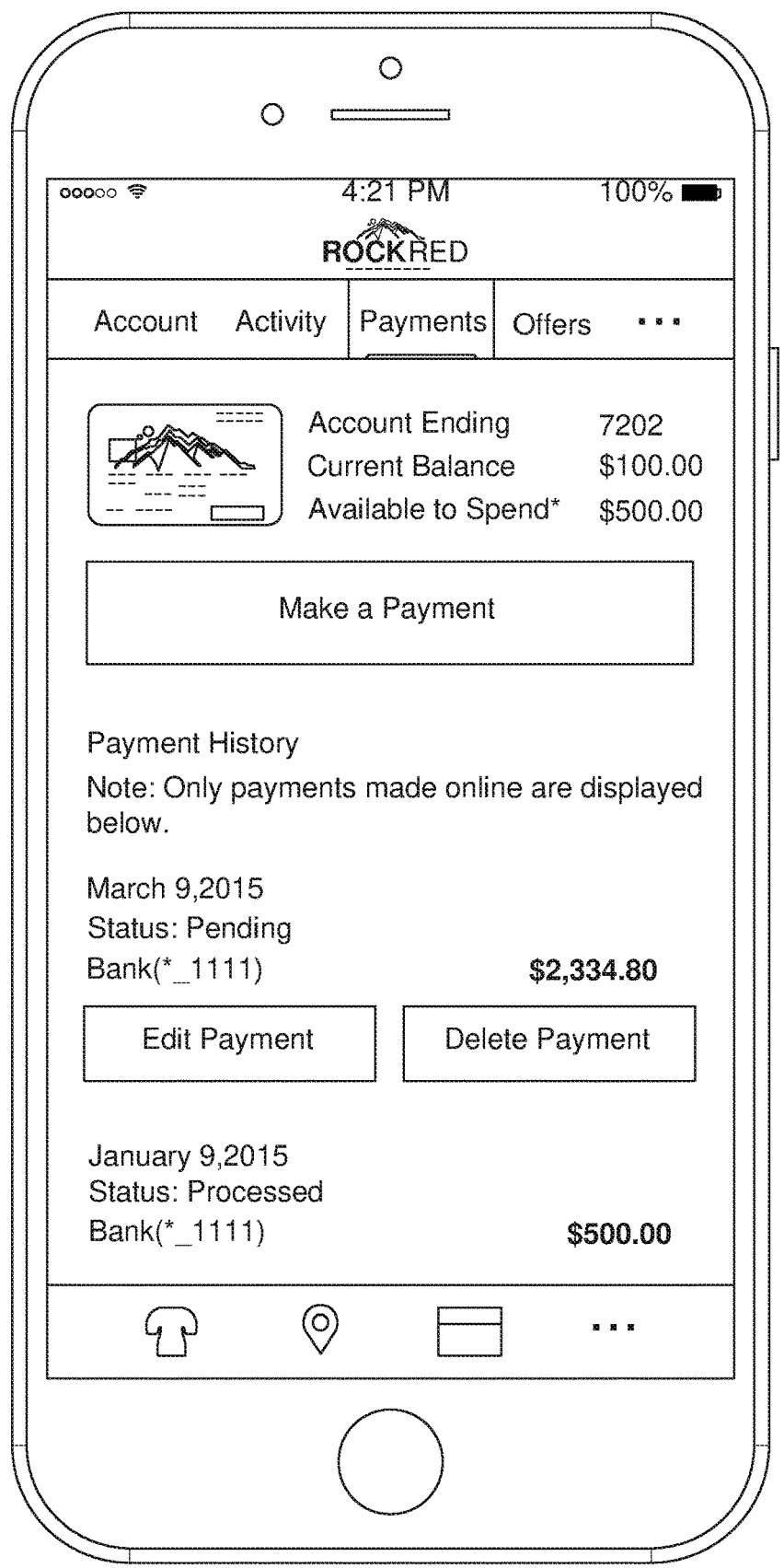
Figure 2K:
Figure 2L:
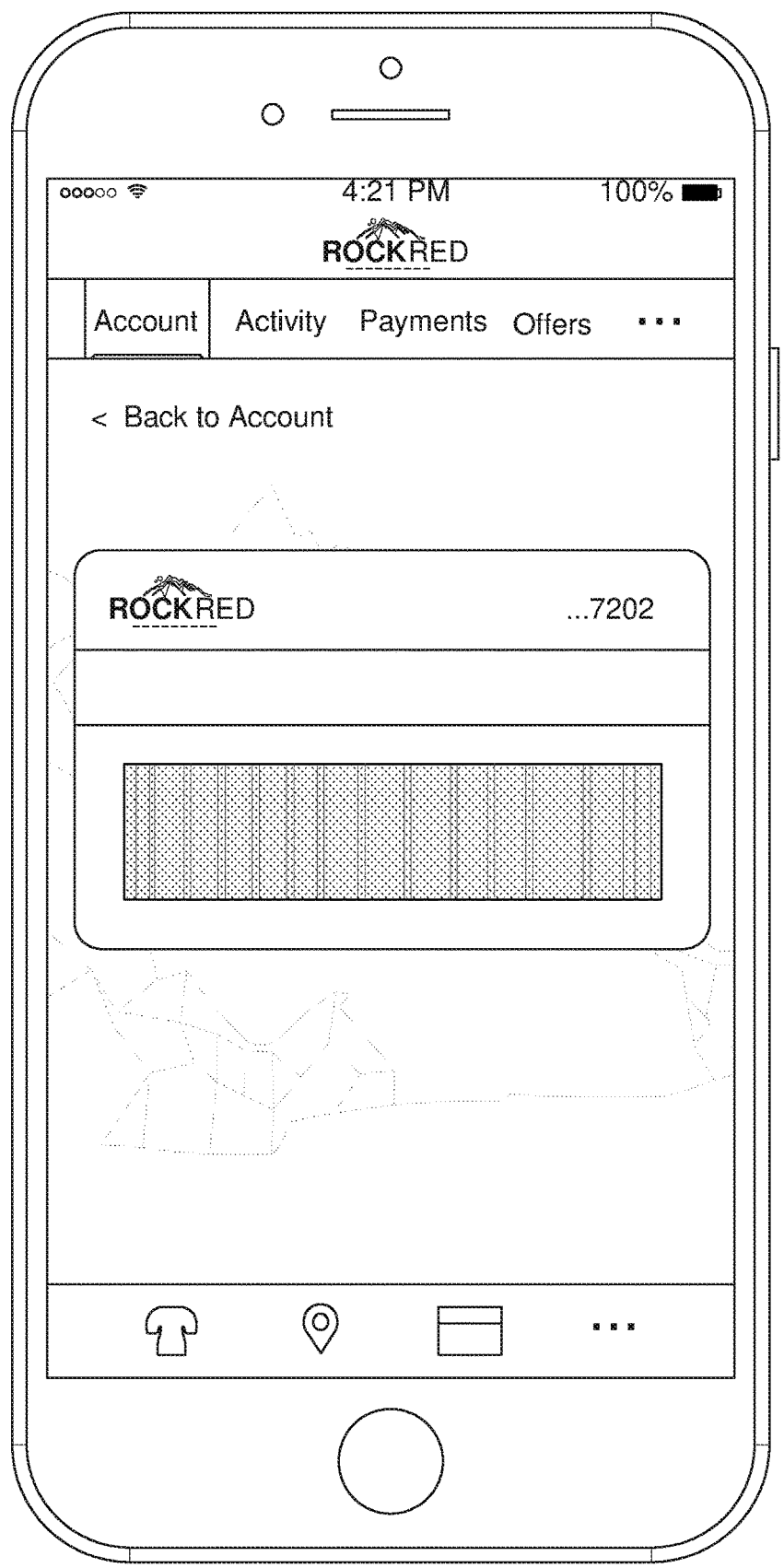

After the end user 150 has logged in and has been authenticated, the financial services application 120 displays a confirm checkout user interface, as shown in FIG. 2F. The confirm checkout user interface includes a "Confirm Checkout using RockRed Card" confirmation button 218 that, when selected, completes the purchase transaction using the financial services application 120. To complete the purchase transaction, the financial services application 120 transmits personal information of the end user 150, such as personal identification information (e.g., username and password) or personal account information (e.g., credit card account information) to the financial services server 140, where the purchase transaction is verified.

By completing the purchase transaction using the financial services application 120, the end user 150 avoids providing personal information (e.g., credit card information) to a retailer via the retailer application 110, thereby improving the security functionality of the computer by protecting the user's personal information from being compromised. These embodiments represent an improvement over conventional applications that merely request the user to provide the personal information (e.g., credit card information) to complete the transaction.

Besides the checkout functionality, different embodiments of the financial services application 120 include additional financial services functionality. The additional financial services functionality can be accessed via a multitude of different methods. In one example, the additional financial services functionality is accessed by the end user by selecting a credit card link 219, as shown on FIG. 2G.

There are a number of different examples of additional financial services functionality. For instance, in some embodiments, the financial services application 120 displays functionality to view an account balance for an retailer-specific account of the end-user 150 provided by the financial institution (see, for example, FIG. 2H). In a further example, in some embodiments, the financial services application 120 displays functionality to view an transaction history for the retailer-specific account of the end-user 150 provided by the financial institution (see, for example, FIG. 2I). In a further example, in some embodiments, the financial services application 120 displays functionality to pay the account balance for the retailer-specific account of the end-user 150 provided by the financial institution (see, for example, FIG. 2J). In a further example, in some embodiments, the financial services application 120 displays offers associated with the retailer-specific account of the end-user 150 provided by the financial institution (see, for example, FIG. 2K). In a further example, in some embodiments, the financial services application 120 implements functionality to display a digital scan-able credit card associated with the retailer-specific account of the end-user 150 provided by the financial institution (see, for example, FIG. 2L).

Figure 2M:
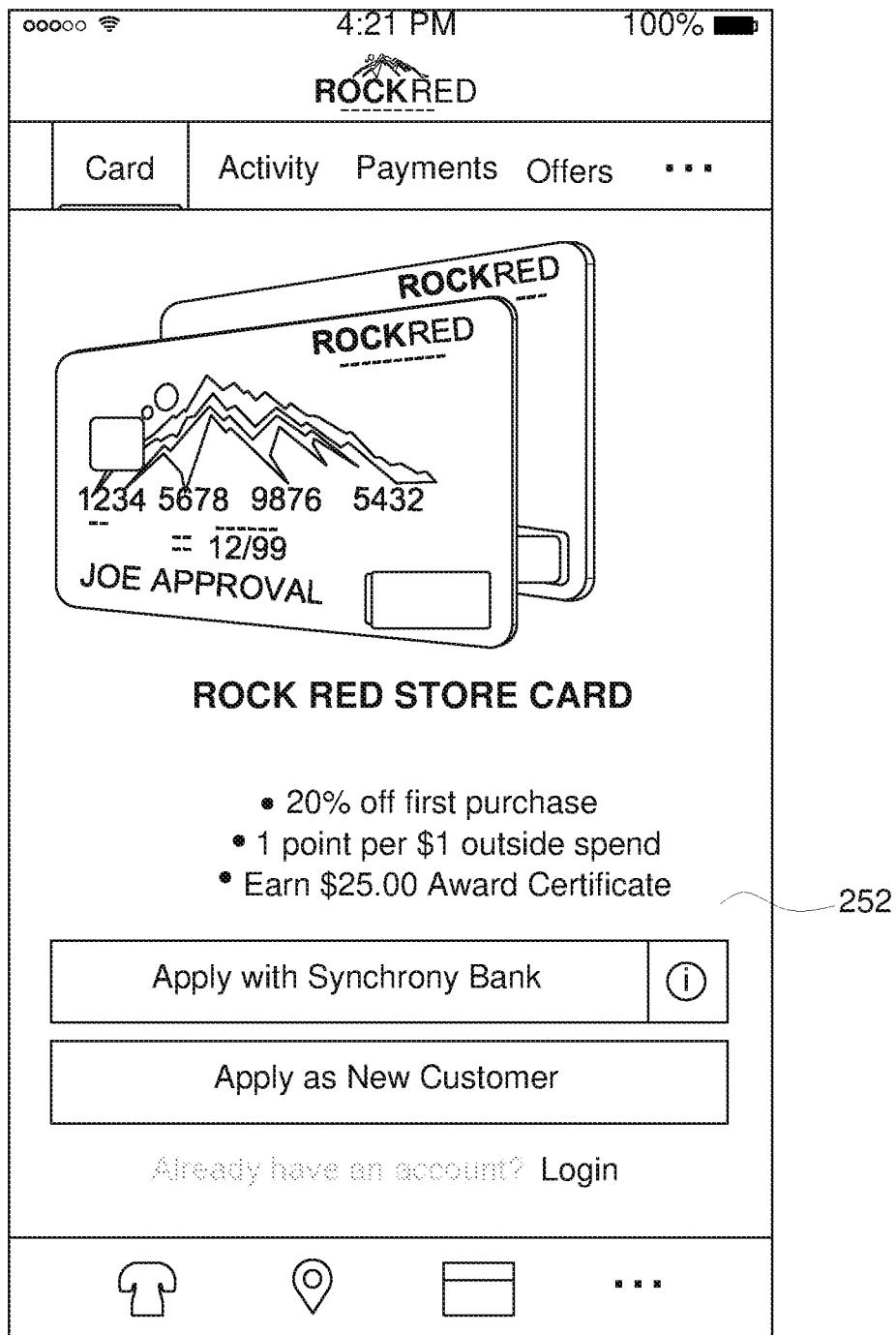
Figure 2N:
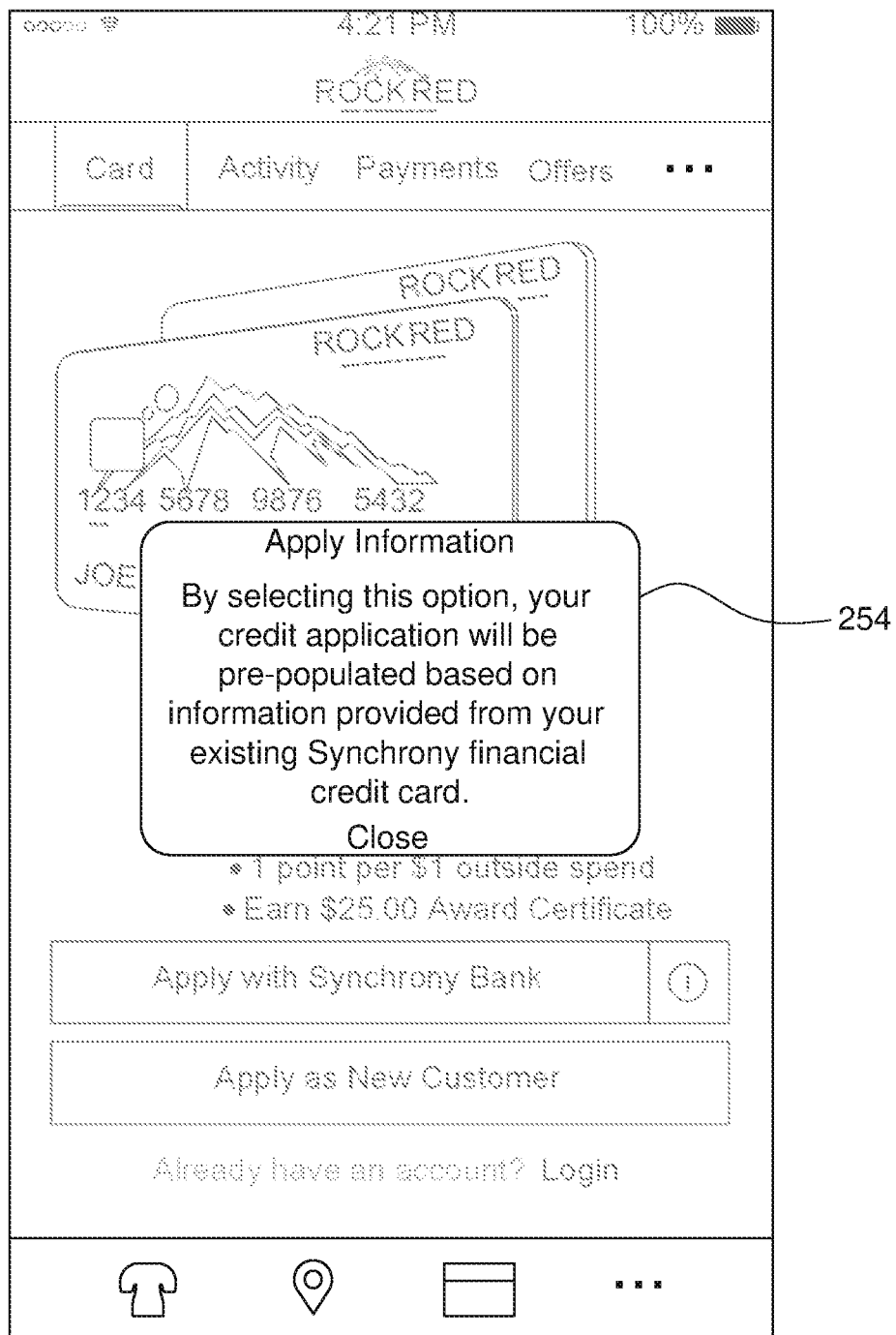
Figure 2O:
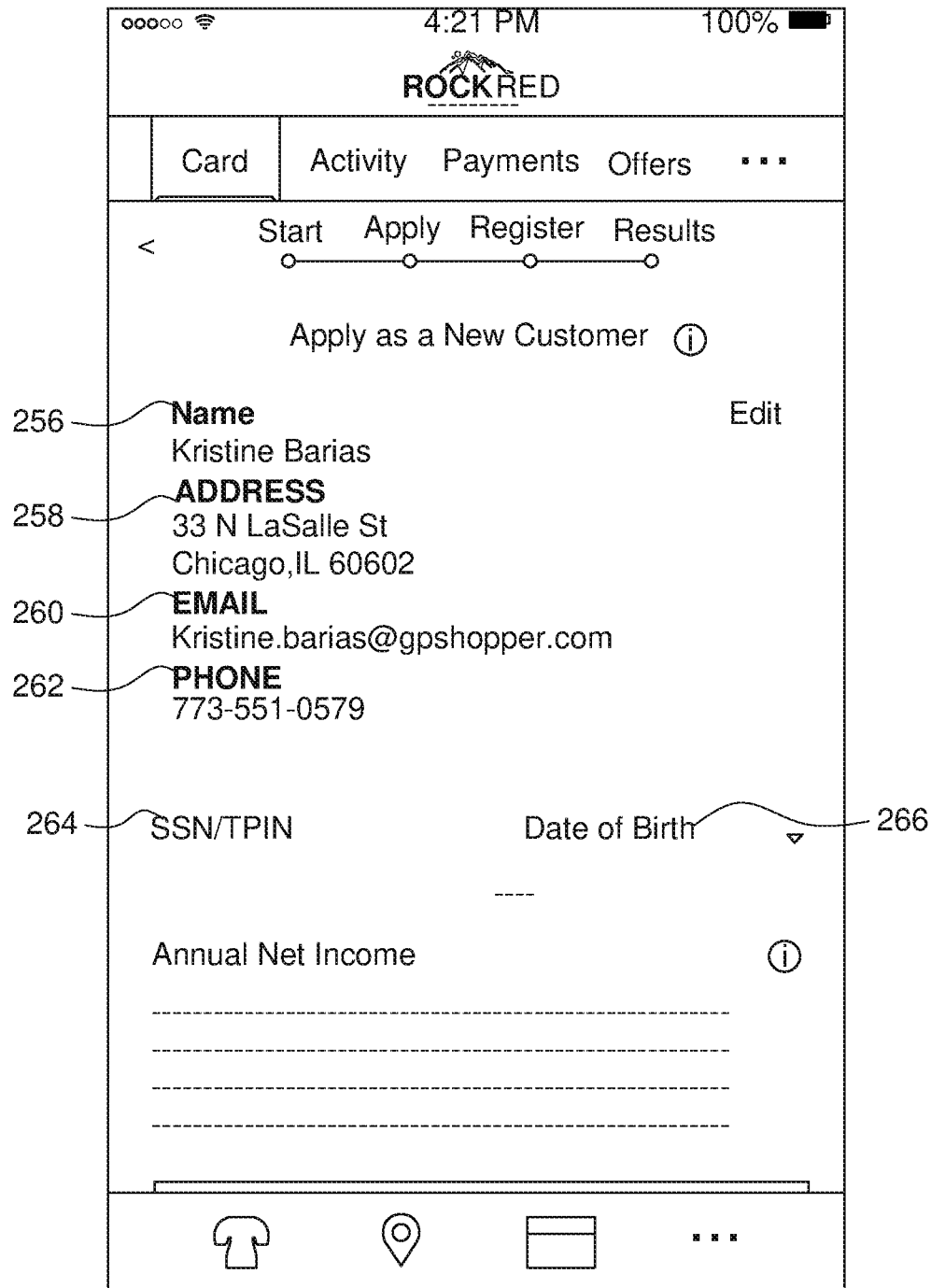
Figure 2P:
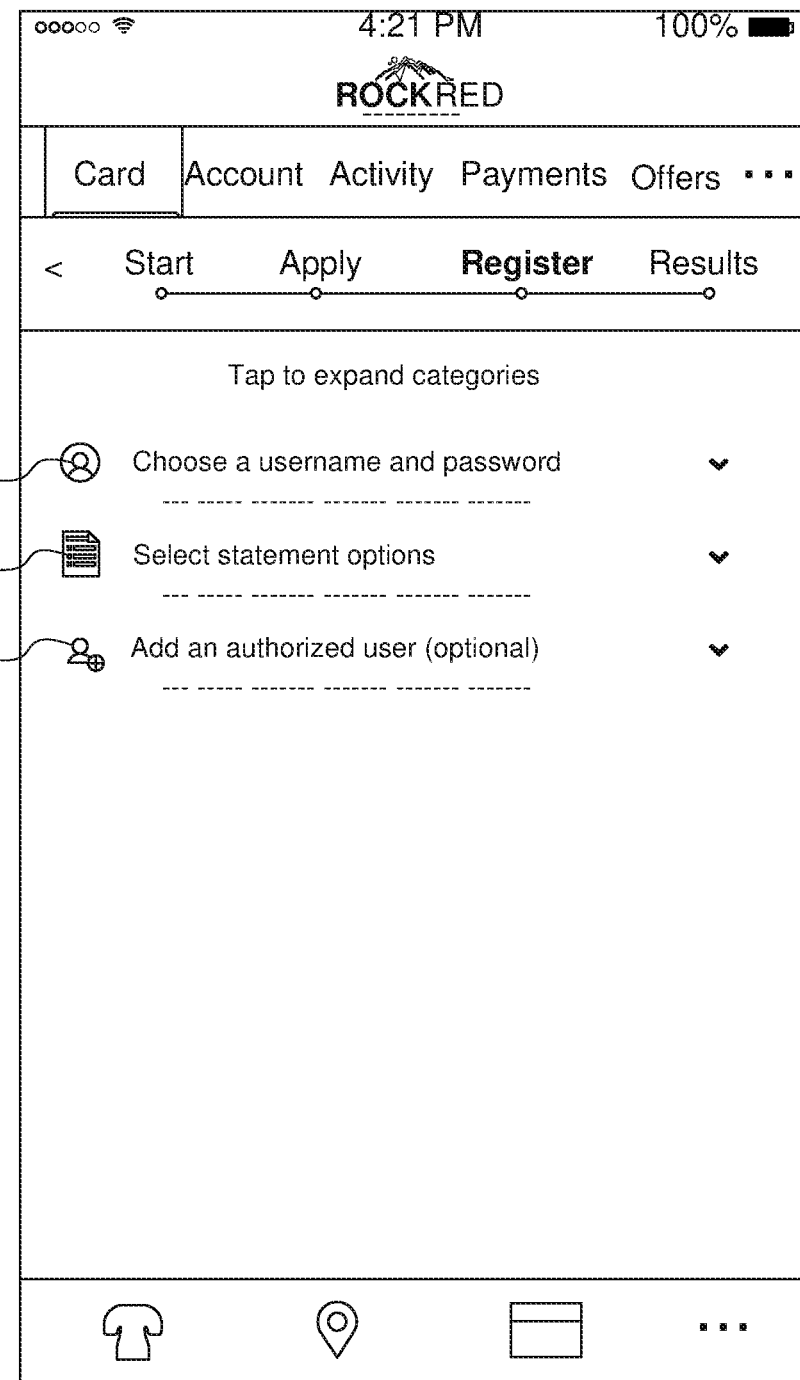
Figure 2R:
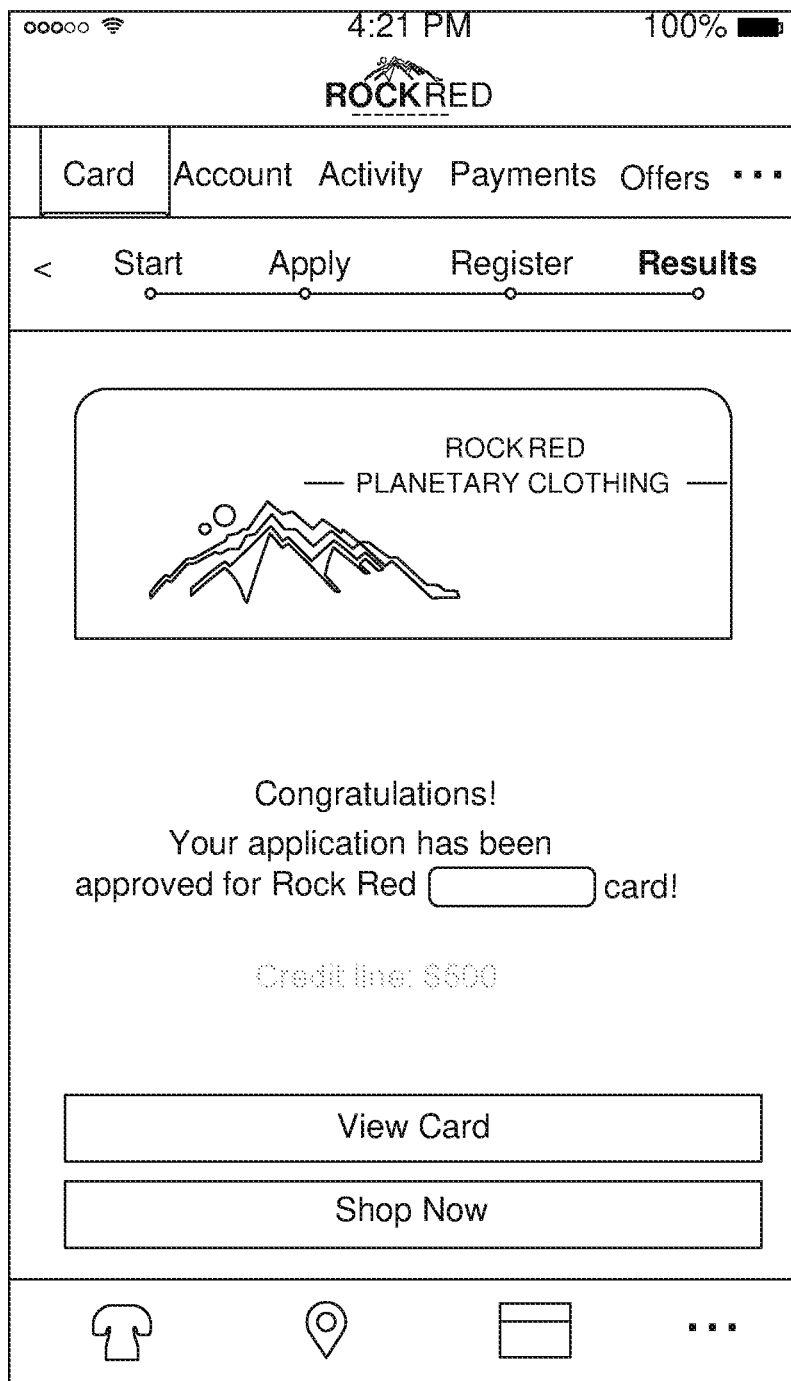
Figure 2S:
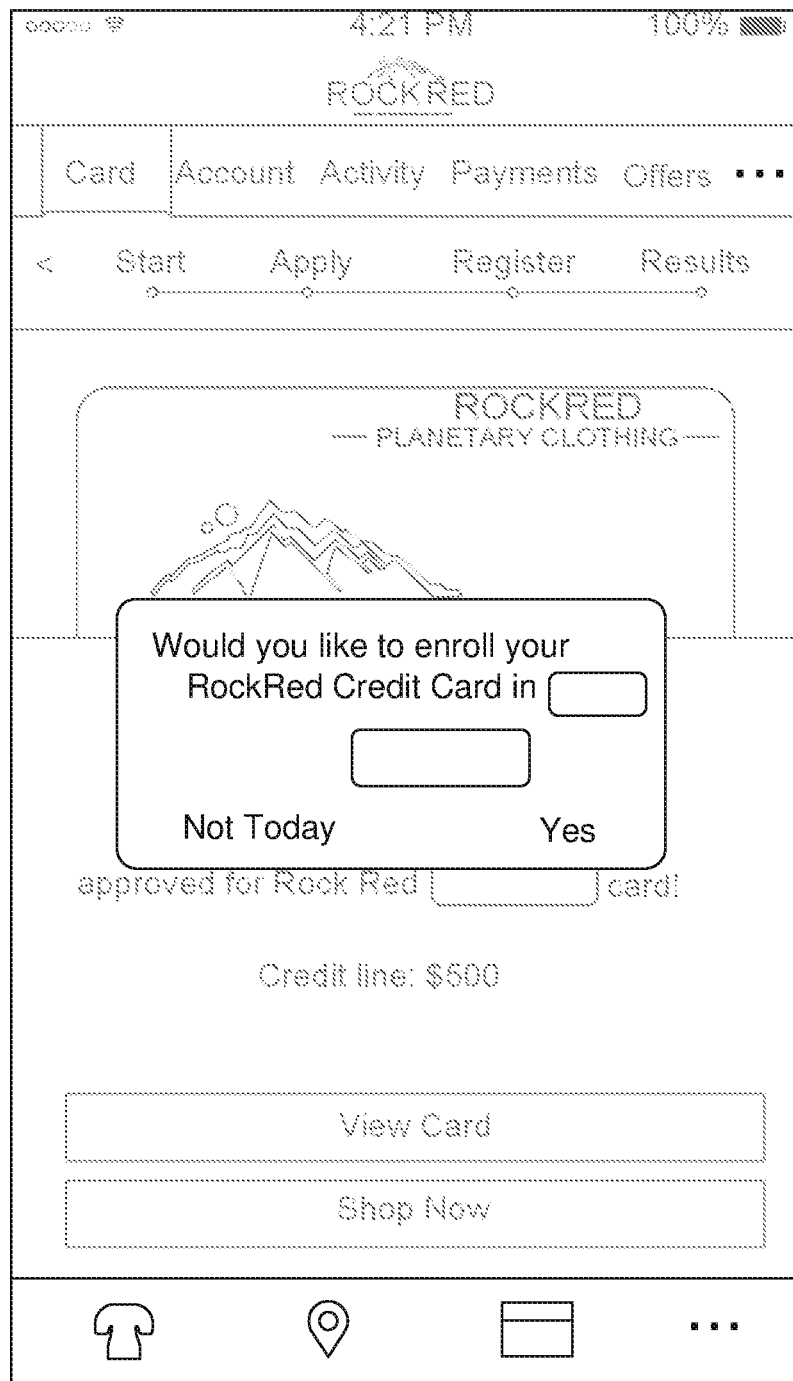
Figure 2T:
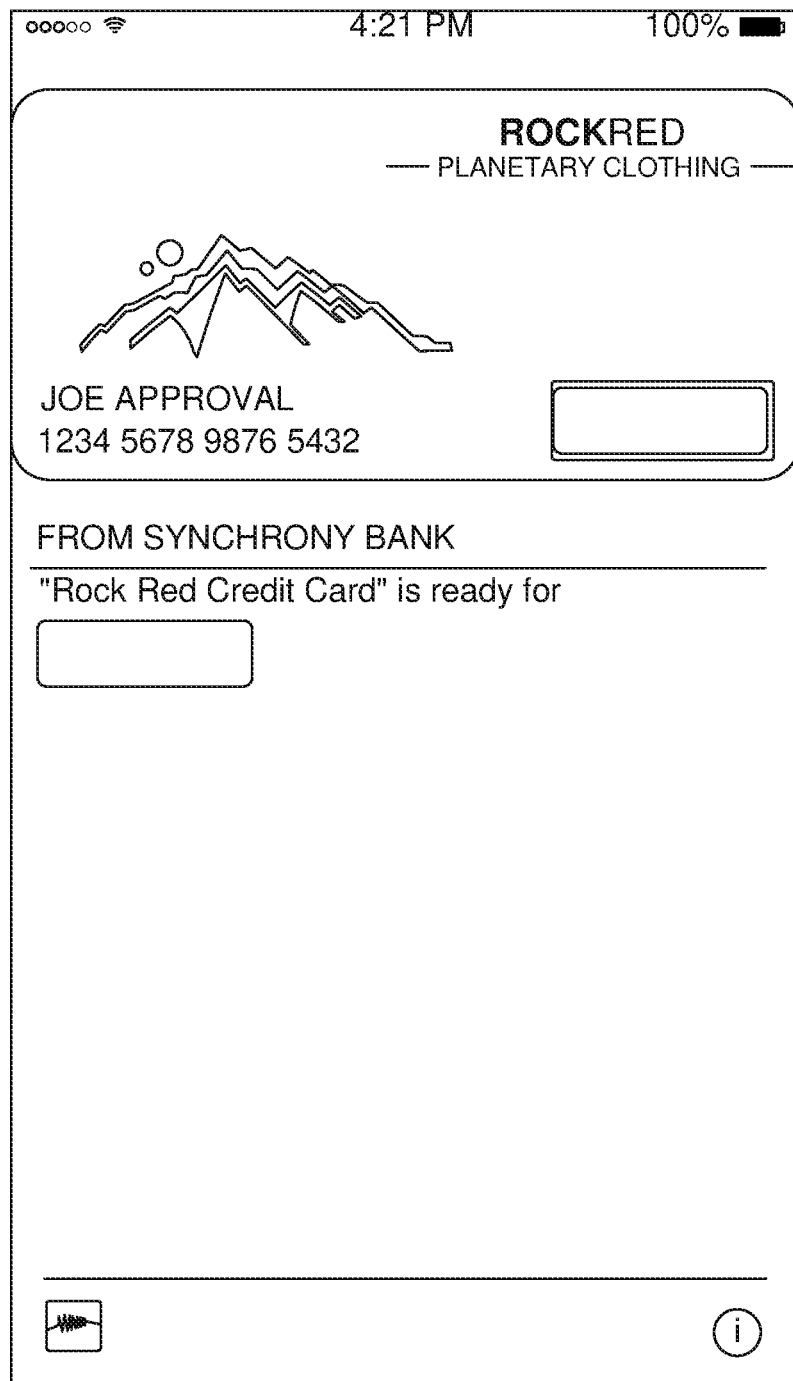

FIGS. 2M-2T illustrate exemplary user interfaces for applying for new credit usable for purchases in the host application by using data that is inaccessible to the host application, according to at least some embodiments of the invention. As illustrated in FIG. 2M, after the user navigates through the host application to the child application, the user is presented with a user interface that includes an offer for credit (e.g., a Rock Red Store Card). In some embodiments, the child application may display opt-in options for data sharing (e.g., "Apply with Synchrony Bank" selectable icon 252) to the user. If the user selects an option that involves data sharing between the host and child application, or with a third party data source, the user may be presented with a notification 254, as shown in FIG. 2N. FIGS. 20-2P illustrate a user interface that displays the information shared between host and child applications with the user option to change and/or enter additional data. Examples of such information include applicant name 256, applicant address 258, applicant email 260, applicant phone 262, applicant social security number 264 and applicant date of birth 266 as shown in FIG. 2O. Examples of such user options include options to choose an applicant user name and password 268, select statement options 270 and add another authorized user 272. FIG. 2Q illustrates a user interface that displays terms and conditions 274 as well as a selectable icon 276 for the user to submit approval to the credit provider to use the applicant information. In some embodiments, the child application may concurrently share data with the host application after the user submits approval. FIG. 2R illustrates a user interface indicating that the user has been approved to use credit (e.g., via a Rock Red card). A user electing to use their card immediately may be prompted to enroll their card in a mobile wallet, either within the host application or a third party application (e.g., APPLE PAY®), separate and distinct from the host application or child application, as illustrated in FIG. 2S. FIG. 2T shows the user interface after a successful enrollment in a third party mobile wallet.

In some embodiments, the retailer application 110 may request end-user specific data associated with the financial institution for a subsequent user interface component to be displayed on a user interface. In these embodiments, the retailer application 110 interfaces with the financial services application 120 through connection 130 to call or request functionality that is not available through the retailer application 110 but, instead, is available from the financial services server 140 of the financial institution (e.g., credit offers) via the financial services application 120. The retailer application 110 may display that functionality in connection with other functionality of the retailer application 100 (e.g., the cart page or the home page of the retailer application 110). Thus, embodiments of the present invention allow the user to take advantage of functionality of two separate applications (e.g., the retailer application 110 and those available from the financial services server 140 of the financial institution via the financial services application 120) in a single user interface, e.g., displayed on mobile device 100.

For example, from the cart page, retailer application 110 can call a function (e.g., Show Promo function) executed by financial services application 120 to display information from the functionality that is available from the financial services server 140 of the financial institution. Examples of the different call functions are described in more detail below.

Figure 3A:
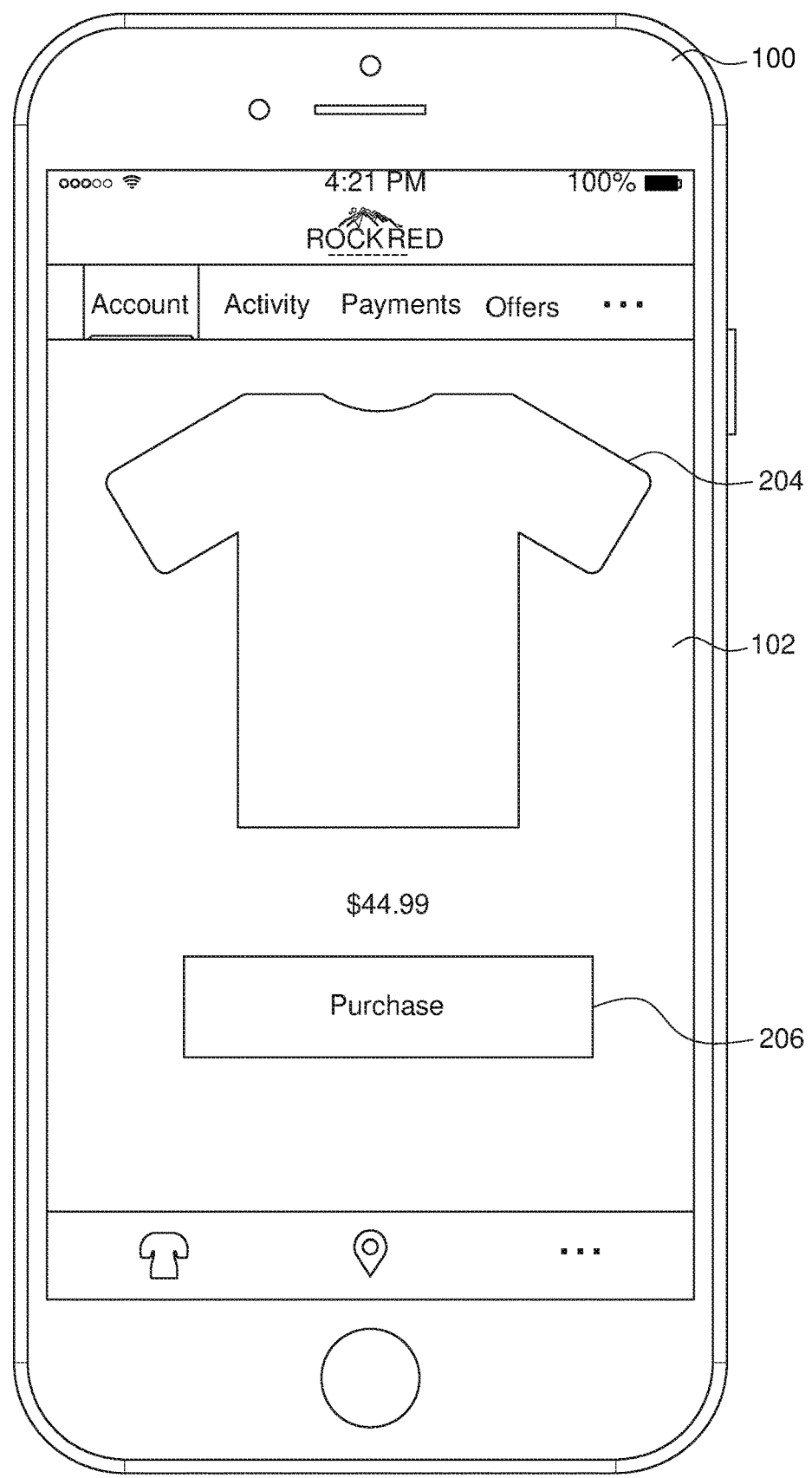
FIGS. 3A-3C illustrate exemplary user interfaces for extending functionality of a host application on an electronic device by providing user-specific offers on the host application using data that is inaccessible to the host application, according to at least some embodiments of the invention.
Figure 3B:
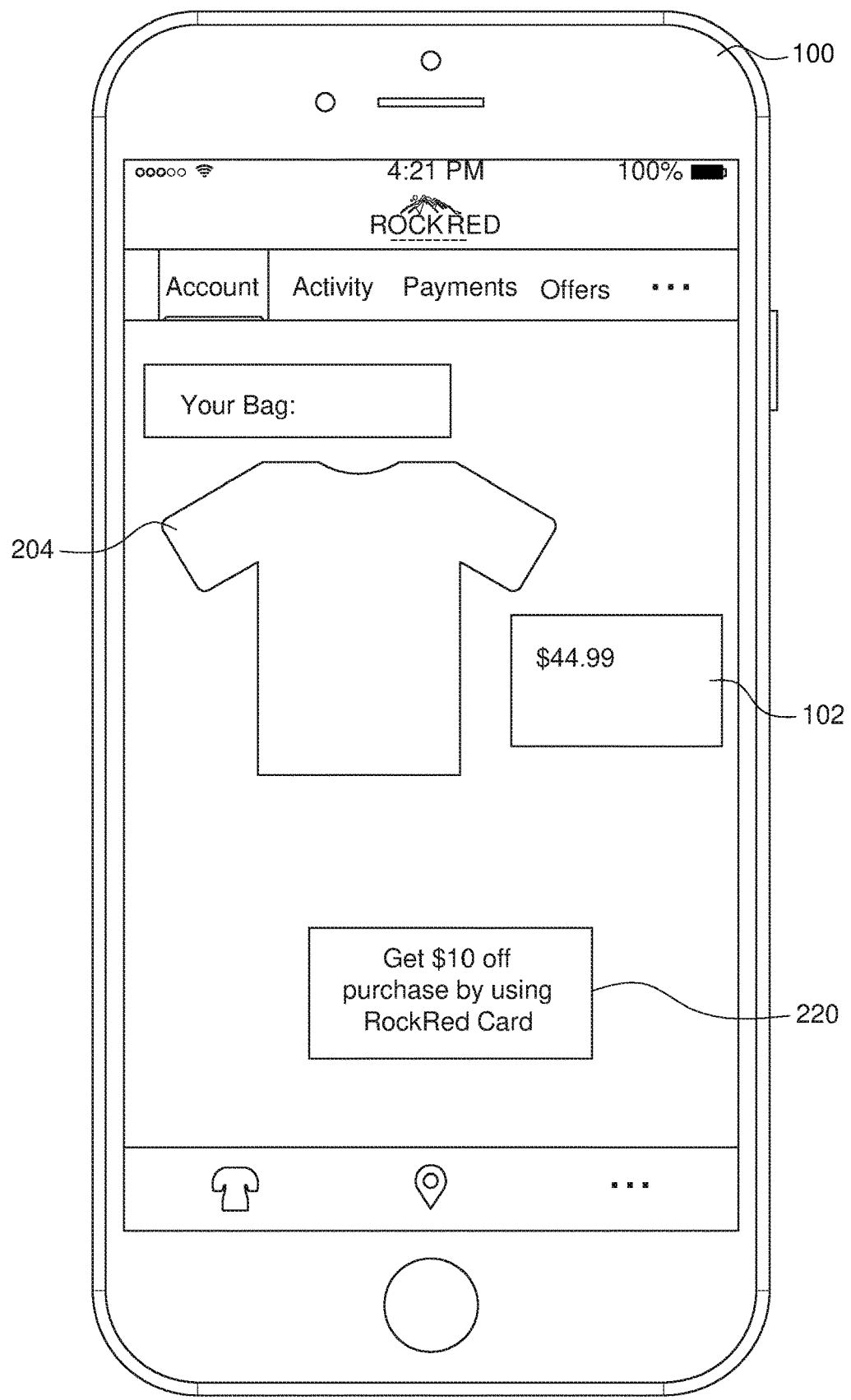
Figure 3C:
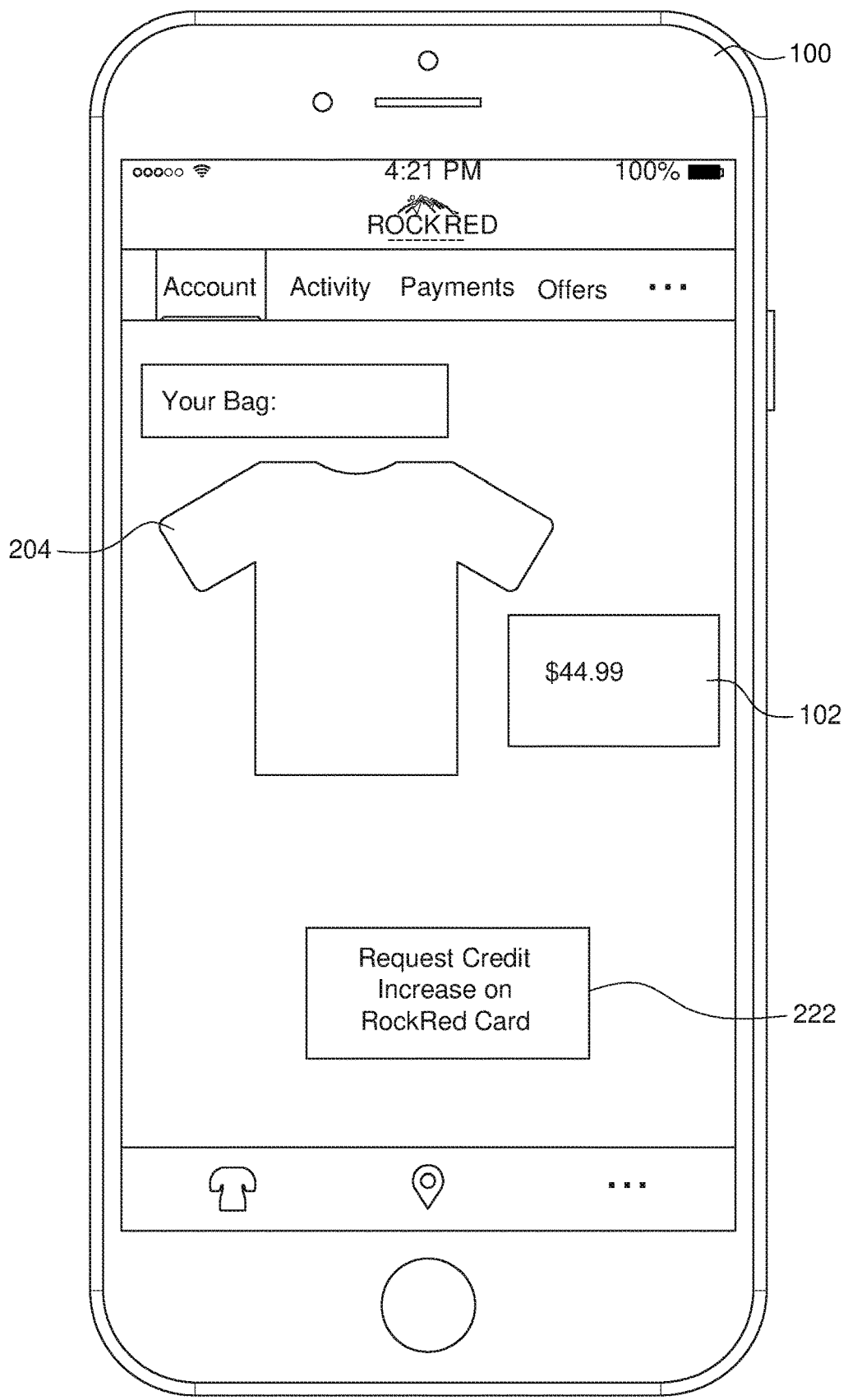

FIGS. 3A-3C illustrate exemplary user interfaces for extending functionality of a host application on an electronic device by providing user-specific data (e.g., targeted offers) on the host application using data that is inaccessible to the host application, according to at least some embodiments of the invention.

FIG. 3A is similar to the user interface shown in FIG. 2B, where the user navigates to a user interface of the retailer application 110 showing a shirt that the user would like to purchase. In some embodiments, in response to a user indication that the user desires to buy the item (i.e., the shirt) a retailer may provide an offer or promotion (e.g., $10 off a purchase) 220 to an end user 150 via the retailer application 110 to use a retailer-specific credit card to complete the transaction. However, the retailer may only desire to provide the offer or promotion under certain conditions such as if certain end-user-specific offer criteria is met. In some embodiments, the end-user-specific offer criteria is based on available credit on a retailer-specific credit card of an end user 150. For example, as shown in FIG. 3B, the offer or promotion may only be provided if enough is credit available on the retailer-specific credit card account of the end user 150 to complete the transaction. In these embodiments, the retailer application 110 may request the financial services application 120 to retrieve data associated with the retailer-specific credit account (e.g., available credit) of the end user 150. In response, the financial services application 120 retrieves the available credit information for the end user 150 from financial services server 140.

In these embodiments, if the retailer application 110 or the financial services application 120 determines that the total amount of items selected by the end user 150 is less than the amount of available credit associated with the retailer-specific credit account of the end user 150 (i.e., that the data associated with the retailer-specific credit account meets end-user-specific offer criteria), then the offer or promotion is displayed to the end user 150 (e.g., on the cart page user interface or front page user interface of the retailer application 110 or a user interface of the financial services application 120). Given the amount of money to be spent on the items in the cart, the retailer application 110 or financial services application 120 can now return a promotion and ensure that the promotion is valid for someone who has the available credit to spend.

In some embodiments, as shown in the checkout cart user interface illustrated in FIG. 3C, a retailer application 110 may provide an offer or promotion 222 to an end user 150 to increase a credit limit for a retailer-specific credit account to complete a transaction if certain end-user-specific offer criteria is not met. For example, the offer or promotion 222 is only provided if there is not enough credit available on the retailer-specific credit card account of the end user 150 to complete the transaction. In these embodiments, the retailer application 110 may request the financial services application 120 to retrieve data associated with the retailer-specific credit account (e.g., available credit) of the end user 150. In response, the financial services application 120 retrieves the available credit information for the end user 150 from financial services server 140.

In these embodiments, if the retailer application 110 or the financial services application 120 determines that the total amount of items selected by the end user 150 is greater than the amount of available credit associated with the retailer-specific credit card of the end user 150 (i.e., that the data associated with the retailer-specific credit account does not meet the end-user-specific offer criteria), then the offer or promotion to increase the credit limit for the retailer-specific credit card is displayed to the end user 150 (e.g., on the cart page user interface or front page user interface of the retailer application 110 or a user interface of the financial services application 120). Upon selection to increase the credit limit, the retailer application 110 or the financial services application 120 walks the user through a process to increase the credit limit for the retailer-specific credit card of the end user 150. This process can be used to ensure that the user has sufficient credit to make the purchase.

While the preceding example uses available credit on a retailer-specific credit account to determine whether certain end-user-specific offer criteria is met, it is contemplate that other criteria may be used to determine whether certain end-user-specific offer criteria is met, including user demographic information and user behavioral information (e.g., purchase history), among others. Other examples of offer criteria include geographic, temporal, climate (i.e., weather), and artificial intelligent software for predicting user behavior.

By leveraging available balance information on a financial account only accessible to the financial services application 120, the retailer application 110 can provide more-effective targeted offers to the end user 150 without having direct access to personal information (e.g., financial account identification information) of the user. These embodiments improve the security functionality of the computer by protecting the user's personal information from being compromised while also enhancing functionality of the retailer application 110 to provide more-effective targeted offers. These embodiments represent an improvement over conventional applications that merely request the user to provide additional personal details, such as a personal identification information for a financial account, to access additional information (e.g., financial account information) of the user.

Exemplary Process Flow Embodiments

Figure 4:
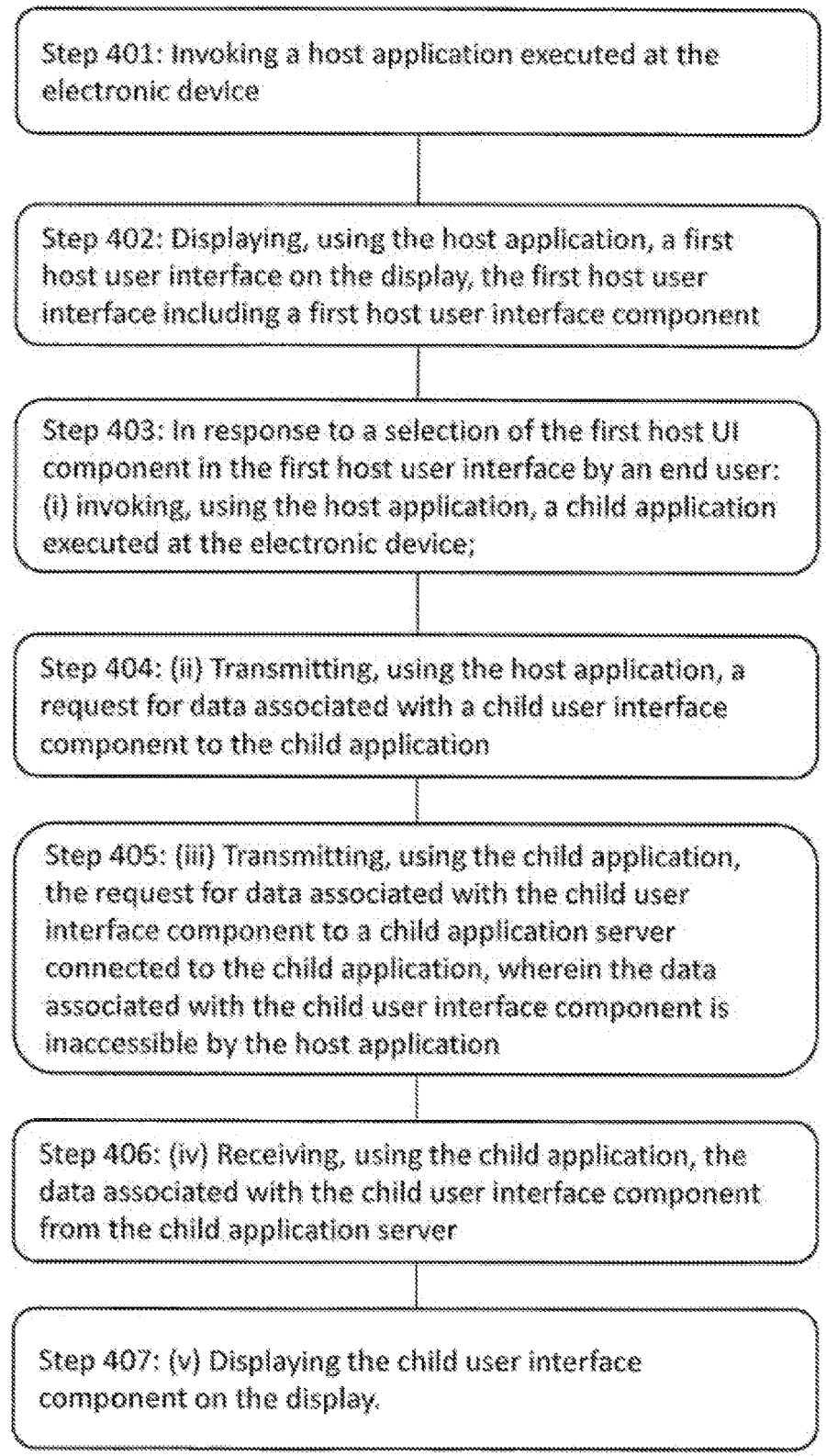
FIG. 4 illustrates a flow diagram illustrating a method performed by an electronic device for extending the functionality of a host application based on data that is inaccessible to the host application, in accordance with some embodiments of the invention.

FIG. 4 illustrates a flow diagram depicting a method 400 performed by an electronic device for extending the functionality of a host application based on data that is inaccessible to the host application, in accordance with some embodiments of the invention.

At step 401, the electronic device (e.g., the client device 100) invokes a host application executed at the electronic device 100. In some embodiments, the host application is a retailer application.

At step 402, the electronic device 100 displays, using the host application 110, a first host user interface (e.g., the user interface in FIG. 2B, the user interface in FIG. 2G) on the display (e.g., user interface 102). In some embodiments, the first host user interface includes a first host user interface component (e.g., purchase button 206 in FIG. 2B, credit card link 219 in FIG. 2G).

At step 403, in response to a selection of the first host UI component in the first host user interface by an end user, the electronic device 100 invokes, using the host application, a child application (e.g., a financial services application 120) executed at the electronic device 100.

At step 404, in further response, the electronic device 100 transmits, using the host application 110, a request for data associated with a child user interface component to the child application 120.

At step 405, in further response, the electronic device 100 transmits, using the child application 120, the request for data associated with the child user interface component to a child application server 140 connected to the child application 120. In some embodiments, the data associated with the child user interface component is inaccessible by the host application 110. In some embodiments, the child application 120 is configured to receive personal information provided by the end user 150 (e.g., via a previously-displayed child user interface) that is inaccessible by the host application. In some embodiments, the request for data associated with the child user interface component transmitted from the child application includes the personal information provided by the end user. For example, in some embodiments, the personal information is personal identification information or retailer-specific financial account information.

At step 406, in further response, the electronic device 100 receives, using the child application 120, the data associated with the child user interface component from the child application server 140. In some embodiments, the data associated with the child user interface component is a child user interface as shown in FIG. 2E or any of FIGS. 2H-2L. In some embodiments, data displayed on the child user interface and data received via the child user interface is inaccessible by the host application. An example of data displayed on the child user interface includes data associated with a financial account of the end user 150, among others.

At step 407, in further response, the electronic device 100 displays the child user interface component on the display. In some embodiments, the child user interface component is a child user interface as shown in FIG. 2E and FIGS. 2H-2L. In some embodiments, the child user interface component is a selectable affordance (e.g., a confirm checkout button 218, a checkout button 220 or a request for a credit increase on a financial account button 222).

In some embodiments, as shown in exemplary FIGS. 3A-3C, the electronic device 100 provides, using the child application 120, the data associated with the child user interface component to the host application 110; and displays, using the host application 110, the child user interface component on the display. In some embodiments, the host application 110 is a retailer application, the child application 120 is a financial services application and the data associated with a child user interface component includes data associated with a retailer-specific financial account with a credit limit of the end user 150. In these embodiments, in response to a determination that the data associated with the retailer-specific financial account (e.g., the available credit limit) meets end-user-specific offer criteria, the electronic device 100 displays, using the retailer application 110, a first offer to the end user to use the retailer-specific credit account to make a purchase (see e.g., FIG. 3B). In some embodiments, in response to a determination that the data associated with the retailer-specific financial account (e.g., the available credit limit) does not meet end-user-specific offer criteria, the electronic device 100 displays, using the retailer application 110, a second offer to the end user (e.g., to request a credit limit increase for the retailer-specific credit account to make a purchase (see e.g., FIG. 3C)) where the second offer is different from the first offer.

By providing limited access to the data associated with the child user interface component (i.e., financial account information of an end user 150) using the child application 120, the end user 150 can avoid exposing additional personal information (e.g., personal identification information for the financial institution) from the host application 110 while still allowing the host application 110 to provide user-specific information (e.g., targeted offers) to the end user 150. These embodiments represent an improvement to the security capabilities of a computer by limiting exposure of personal information to different parties while still providing enhanced functionality within a computer application.

A computer system that may be used to implement the methods of the present invention, which methods may be implemented as programmable code for execution by computer system, is now described. More particularly, the computer system comprises hardware, as described more fully herein, that is used in connection with executing software/computer programming code (i.e., computer readable instructions) to carry out the steps of the methods described herein.

The computer system includes one or more processors. The processor may be any type of processor, including but not limited to a special purpose or a general-purpose digital signal processor, specially programmed to perform the methods described herein. Processor may be connected to a communication infrastructure (e.g. a data bus or computer network) either via a wired connection or a wireless connection. Communication infrastructure carries signals and may be implemented using wire or cable, fiber optics, a phone line, a wireless link, a cellular phone link, a radio frequency link, or any other suitable communication channel, including a combination of the foregoing exemplary channels.

The computer system includes one or more memories. The memory may include at least one of: random access memory (RAM), a hard disk drive and a removable storage drive, such as a floppy disk drive, a magnetic tape drive, or an optical disk drive. The removable storage drive reads from and/or writes to a removable storage unit. The removable storage unit can be a floppy disk, a magnetic tape, an optical disk, which is read by and written to a removable storage drive.

In alternative implementations, memory may include other similar means for allowing computer programs or other instructions to be loaded into computer system. Such means may include, for example, a removable storage unit and an interface. Examples of such means may include a removable memory chip (such as an EPROM, or PROM, or flash memory) and associated socket, and other removable storage units and interfaces which allow software and data to be transferred from removable storage unit to the computer system. Alternatively, the program may be executed and/or the data accessed from the removable storage unit, using the processor of the computer system.

The computer system includes one or more user interfaces. The user interface may be a program that controls a display of computer system, on which the output of the processes described herein can be displayed. The user interface may include one or more peripheral user interface components, such as a keyboard or a mouse. The end user may use the peripheral user interface components to interact with computer system. The user interface may receive user inputs, such as mouse inputs or keyboard inputs from the mouse or keyboard user interface components.

Thus, in exemplary embodiments, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer-implemented method, comprising:
    recording an input using a host application executed by one or more processors of a device, wherein the input is stored as tracking data for the device, and wherein the input corresponds to shopping behavior;
    invoking a child application in response to a selection within the host application, wherein the child application is associated with a child application server, wherein the child application server is distinct from a host server, and wherein the child application is executed by the one or more processors of the device;
    transmitting, by the device, a request for user data associated with the child application, the request including the tracking data, wherein when the request is transmitted to the child application server, the child application server selects an offer for the device, wherein the offer is based on the tracking data and sensitive information associated with the device;
    receiving the user data and the offer by the child application, the user data associated with the child application including the sensitive information;
    segmenting, by the child application, a portion of the user data, wherein segmenting includes encrypting the portion of the user data in accordance with a security model of the child application, wherein segmenting is performed using the one or more processors of the device, and wherein segmenting prevents the sensitive information from being exposed to the host application and the host server; and
    facilitating presentation of the offer on a display of the device, wherein segmenting allows display of the offer using the host application to be based on the sensitive information and the tracking data.

2. The computer-implemented method of claim 1, wherein facilitating presentation of the offer includes generating an integrated user interface display based on data associated with the host application and the sensitive information, wherein segmentation of the sensitive information prevents the sensitive information associated with the child application from being exposed to the host application during generation of an integrated display.

3. The computer-implemented method of claim 1, further comprising:
    generating an integrated user interface display, wherein the integrated user interface display includes at least one user interface component associated with the host application and at least one user interface component associated with the child application.

4. The computer-implemented method of claim 1, further comprising:
    receiving, by the child application, input data associated with an indication that an end user would like to apply for credit; and communicating, by the child application, request data associated with the input data to the child application server, wherein the offer is a credit offer in association with the request data.

5. The computer-implemented method of claim 1, further comprising:
receiving data associated with the tracking data stored on a child application server associated with the child application, wherein the offer is further based on the data associated with the tracking data.

6. The computer-implemented method of claim 1, wherein the child application is invoked based on a navigation input at the host application associated with offers for credit.

7. The computer-implemented method of claim 1, further comprising:
facilitating a purchase associated with the offer; and
updating the tracking data for the device with information associated with the purchase.

8. A device, comprising:
a memory; and
one or more processors coupled to the memory, the one or more processors configured to perform operations comprising:
recording an input using a host application executed by the one or more processors of the device, wherein the input is stored as tracking data for the device, and wherein the input corresponds to shopping behavior;
invoking a child application in response to a selection within the host application, wherein the child application is associated with a child application server, wherein the child application server is distinct from a host server, and wherein the child application is executed by the one or more processors of the device;
transmitting, by the device, a request for user data associated with the child application, the request including the tracking data, wherein when the request is transmitted to the child application server, the child application server selects an offer for the device, wherein the offer is based on the tracking data and sensitive information associated with the device;
receiving the user data and the offer by the child application, the user data associated with the child application including the sensitive information;
segmenting, by the child application, a portion of the user data, wherein segmenting includes encrypting the portion of the user data in accordance with a security model of the child application, wherein segmenting is performed using the one or more processors of the device, and wherein segmenting prevents the sensitive information from being exposed to the host application and the host server; and
facilitating presentation of the offer on a display of the device, wherein segmenting allows display of the offer using the host application to be based on the sensitive information and the tracking data.

9. The device of claim 8, wherein facilitating presentation of the offer includes generating an integrated user interface display based on data associated with the host application and the sensitive information, wherein segmentation of the sensitive information prevents the sensitive information associated with the child application from being exposed to the host application during generation of an integrated display.

10. The device of claim 8, wherein the one or more processors are configured for operations further comprising:
generating an integrated user interface display, wherein the integrated user interface display includes at least one user interface component associated with the host application and at least one user interface component associated with the child application.

11. The device of claim 8, wherein the one or more processors are configured for operations further comprising:
receiving, by the child application, input data associated with an indication that an end user would like to apply for credit; and
communicating, by the child application, request data associated with the input data to the child application server, wherein the offer is a credit offer in association with the request data.

12. The device of claim 8, wherein the one or more processors are configured for operations further comprising:
receiving data associated with the tracking data stored on a child application server associated with the child application, wherein the offer is further based on the data associated with the tracking data.

13. The device of claim 8, wherein the child application is invoked based on a navigation input at the host application associated with offers for credit.

14. The device of claim 8, wherein the one or more processors are configured for operations further comprising:
facilitating a purchase associated with the offer; and
updating the tracking data for the device with information associated with the purchase.

15. A non-transitory computer readable medium comprising instructions that, when executed by one or more processors of a device, cause the device to perform operations comprising:
recording an input using a host application executed by the one or more processors of the device, wherein the input is stored as tracking data for the device, and wherein the input corresponds to shopping behavior;
invoking a child application in response to a selection within the host application, wherein the child application is associated with a child application server, wherein the child application server is distinct from a host server, and wherein the child application is executed by the one or more processors of the device;
transmitting, by the device, a request for user data associated with the child application, the request including the tracking data, wherein when the request is transmitted to the child application server, the child application server selects an offer for the device, wherein the offer is based on the tracking data and sensitive information associated with the device;
receiving the user data and the offer by the child application, the user data associated with the child application including the sensitive information;
segmenting, by the child application, a portion of the user data, wherein segmenting includes encrypting the portion of the user data in accordance with a security model of the child application, wherein segmenting is performed using the one or more processors of the device, and wherein segmenting prevents the sensitive information from being exposed to the host application and the host server; and
facilitating presentation of the offer on a display of the device, wherein segmenting allows display of the offer using the host application to be based on the sensitive information and the tracking data.

16. The non-transitory computer readable storage medium of claim 15, wherein facilitating presentation of the offer includes generating an integrated user interface display based on data associated with the host application and the sensitive information, wherein segmentation of the sensitive information prevents the sensitive information associated with the child application from being exposed to the host application during generation of an integrated display.

17. The non-transitory computer readable storage medium of claim 15, wherein the instructions configured the device for operations further comprising:
   generating an integrated user interface display, wherein the integrated user interface display includes at least one user interface component associated with the host application and at least one user interface component associated with the child application.

18. The non-transitory computer readable storage medium of claim 15, wherein the instructions configured the device for operations further comprising:
   receiving, by the child application, input data associated with an indication that an end user would like to apply for credit; and
   communicating, by the child application, request data associated with the input data to the child application server, wherein the offer is a credit offer in association with the request data.

19. The non-transitory computer readable storage medium of claim 15, wherein the instructions configured the device for operations further comprising:
   receiving data associated with the tracking data stored on a child application server associated with the child application, wherein the offer is further based on the data associated with the tracking data.

20. The non-transitory computer readable storage medium of claim 15, wherein the child application is invoked based on a navigation input at the host application associated with offers for credit.

21. The non-transitory computer readable storage medium of claim 15, wherein the instructions configured the device for operations further comprising:
   facilitating a purchase associated with the offer; and
   updating the tracking data for the device with information associated with the purchase.

* * * * *